(12) United States Patent
Rahmane et al.

(10) Patent No.: US 12,736,483 B2
(45) Date of Patent: Sep. 15, 2026

(54) APPARATUSES, SYSTEMS, AND METHODS FOR THREE-DIMENSIONAL, IN-SITU INSPECTION OF AN ADDITIVELY MANUFACTURED COMPONENT

(71) Applicant: General Electric Company, Schenectady, NY (US)

(72) Inventors: Mohamed Rahmane, Ballston Lake, NY (US); Andrey I. Meshkov, Niskayuna, NY (US); Vladimir A. Lobastov, Waterford, NY (US); William R. Ross, Kinderhook, NY (US)

(73) Assignee: General Electric Company, Evendale, OH (US)

( * ) Notice: Subject to any disclaimer, the term of this patent is extended or adjusted under 35 U.S.C. 154(b) by 286 days.

(21) Appl. No.: 18/220,888

(22) Filed: Jul. 12, 2023

(65) Prior Publication Data

US 2025/0020600 A1 Jan. 16, 2025

(51) Int. Cl.
*B29C 64/393* (2017.01)
*G01N 23/046* (2018.01)
(Continued)

(52) U.S. Cl.
CPC ......... *G01N 23/046* (2013.01); *B29C 64/393* (2017.08); *B33Y 30/00* (2014.12); *B33Y 50/02* (2014.12); *G01N 2223/646* (2013.01)

(58) Field of Classification Search
CPC ........... G01N 23/046; G01N 2223/646; G01N 23/04; B29C 64/393; B29C 64/268; B33Y 30/00; B33Y 50/02; B33Y 10/00; G21K 7/00; Y02P 10/25; B22F 10/28; B22F 10/85; B22F 12/41; B22F 12/90; B23K 15/0086
See application file for complete search history.

(56) References Cited

U.S. PATENT DOCUMENTS 3,852,605 A 12/1974 Watanabe et al.
6,005,915 A * 12/1999 Hossain ............ G01N 23/2251 378/70
(Continued)

FOREIGN PATENT DOCUMENTS

JP S50047585 A 4/1975
WO WO-2022239344 A1 * 11/2022

OTHER PUBLICATIONS

Translation of WO 2022239344 A1 (Year: 2022).*
Extended European Search Report for Application No. 24184178.2 dated Nov. 14, 2024 (12 pages).

*Primary Examiner* — Uzma Alam
*Assistant Examiner* — Mamadou Faye
(74) *Attorney, Agent, or Firm* — Dinsmore & Shohl LLP

(57) ABSTRACT

The present disclosure is directed to an additive manufacturing system configured to generate an electron beam directed toward a target to generate x-ray flux. The x-ray flux is directed toward the component through at least one plate with a pinhole. Interactions between the component and the x-ray flux generate x-ray radiation. The at least one detector is configured to detect the x-ray radiation through a pinhole. An analysis component is configured to generate an image comprising a three-dimensional component based on the x-ray radiation detected by the at least detector.

20 Claims, 12 Drawing Sheets

(51) Int. Cl.

| | |
|---|---|
| *B33Y 30/00* | (2015.01) |
| *B33Y 50/02* | (2015.01) |

(56) References Cited

U.S. PATENT DOCUMENTS

| | | | | |
|---|---|---|---|---|
| 9,406,483 | B1 | 8/2016 | Lock | |
| 9,981,341 | B2 | 5/2018 | Mazumder et al. | |
| 9,999,924 | B2 | 6/2018 | Dave et al. | |
| 10,113,981 | B2 | 10/2018 | Mitchell | |
| 10,421,267 | B2 | 9/2019 | Reese et al. | |
| 10,502,701 | B2 | 12/2019 | Lobastov et al. | |
| 10,675,684 | B2 | 6/2020 | Defelice et al. | |
| 2014/0294035 | A1* | 10/2014 | Oda | H01J 37/3045 373/10 |
| 2016/0224017 | A1* | 8/2016 | Huang | B22F 12/90 |
| 2017/0001379 | A1 | 1/2017 | Long | |
| 2017/0274599 | A1 | 9/2017 | Kitamura et al. | |
| 2018/0001565 | A1 | 1/2018 | Hocker | |
| 2018/0071987 | A1 | 3/2018 | Tsumuraya et al. | |
| 2019/0302043 | A1* | 10/2019 | Lobastov | B22F 10/38 |
| 2021/0394271 | A1* | 12/2021 | Lock | C23C 14/52 |
| 2022/0013326 | A1* | 1/2022 | Takaguchi | H01J 37/226 |

* cited by examiner 126
123
128b
111
β
120
105
124
109
145
122
β
113
121
128a
150
130
131
+X
-X
+Y
-Y
+Z, -Z

APPARATUSES, SYSTEMS, AND METHODS FOR THREE-DIMENSIONAL, IN-SITU INSPECTION OF AN ADDITIVELY MANUFACTURED COMPONENT

TECHNICAL FIELD

The present disclosure relates to additive manufacturing systems, and more specifically, for inspection of items within an additive manufacturing chamber.

BACKGROUND

In additive manufacturing processes, particularly those that utilize electron-beam melting of a powder layer to create an article, various emissions, such as x-ray emissions or the like, result from application of an energy beam. When an energy beam traverses a particular pattern on a surface (e.g., a shape engraved in a surface, various surface features of a surface, and/or the like), the emissions that result from energy beam impingement change in accordance with the pattern.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description, explain the principles and operations of the claimed subject matter.

DETAILED DESCRIPTION

Figure 1:
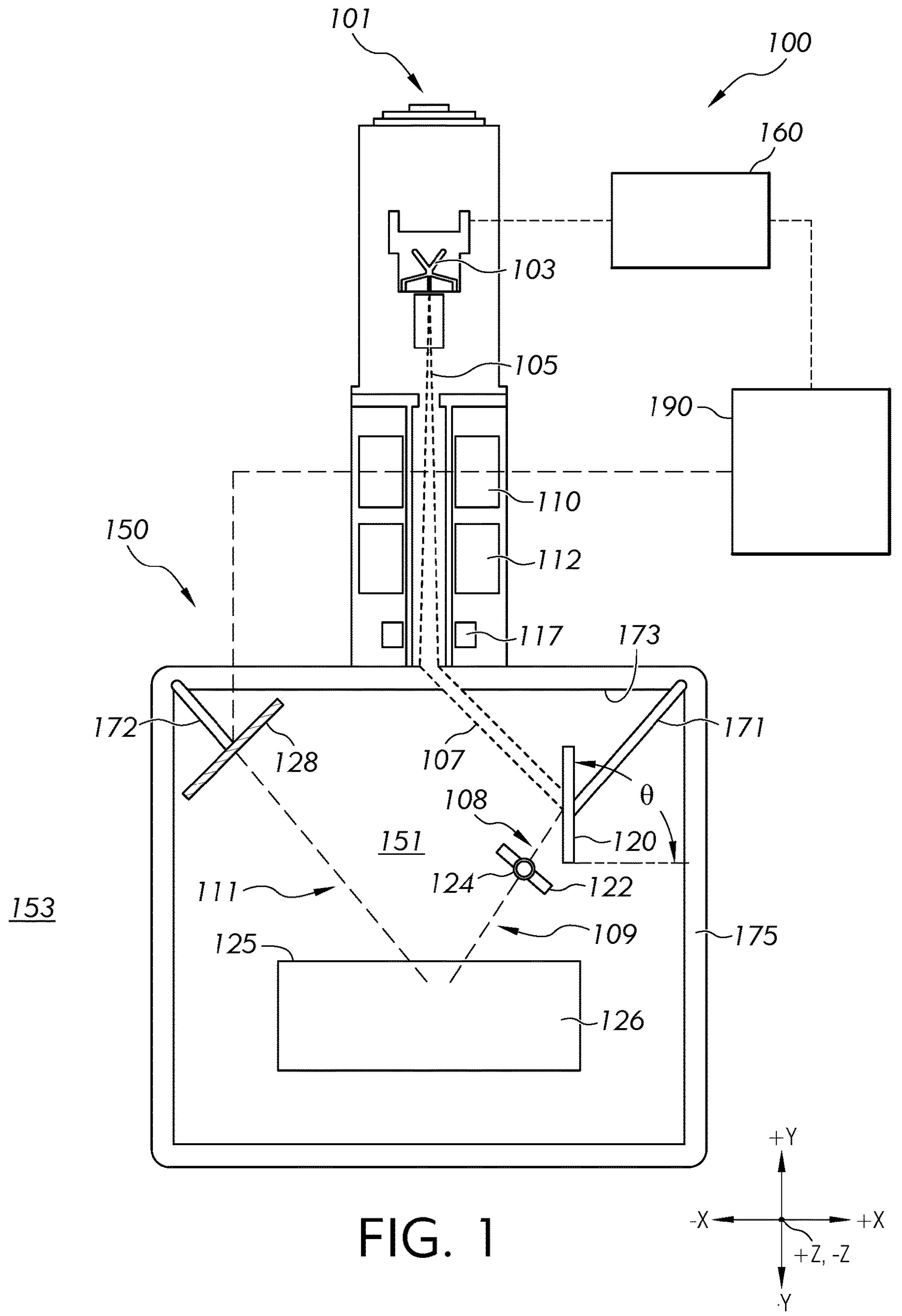
FIG. 1 schematically depicts a cross-section view of an illustrative machine core of an additive manufacturing system according to one or more aspects shown and described herein.

Reference will now be made in detail to various embodiments of devices, assemblies, and methods, examples of which are illustrated in the accompanying drawings. Whenever possible, the same reference numerals will be used throughout the drawings to refer to the same or like parts. One embodiment of an additive manufacturing system 100 is schematically depicted in FIG. 1. The additive manufacturing system 100 includes an electron emitter 103, a target 120, a plate 122 defining a pinhole 124 therethrough, and at least one detector 128. The additive manufacturing system 100 includes the electron emitter 103 that emits an electron beam is deflected by the target 120 at an angle through the pinhole 124 in the plate 122 to impinge a component such that radiation emanates from the component and the detector 128 detects coordinates of the radiation that indicate a three-dimensional spatial reference of the component. Various embodiments of additive manufacturing systems and methods for using the same are described in further detail herein with specific reference to the appended drawings.

Directional terms as used herein—for example up, down, right, left, front, back, top, bottom—are made only with reference to the figures as drawn and are not intended to imply absolute orientation unless otherwise specified.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an," and "the" include plural referents unless the context clearly dictates otherwise. Thus, for example, reference to "a" component includes aspects having two or more such components, unless the context clearly indicates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined or interchanged. Such ranges are identified and include all the sub-ranges contained therein unless context or language indicates otherwise. For example, the approximating language may refer to being within a 10 percent margin.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the illustrative embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of: the time of occurrence of the associated events, the time of measurement and collection of predetermined data, the time to process the data, and the time of a system response to the events and the environment. In the embodiments described herein, these activities and events occur substantially instantaneously.

As used herein, the term "Z-value" refers to elements with relatively high atomic numbers. The atomic number represents the number of protons in the nucleus of an atom and is used to identify and classify elements in the periodic table. For high-Z elements, the z-value is relatively high, typically greater than 80. High-Z elements are characterized by their dense and heavy nature, effective radiation shielding capabilities, and their importance in nuclear physics and medical imaging.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

Electron-beam additive manufacturing, which may also be known as electron-beam melting (EBM), is a type of additive manufacturing (3D printing) process that is typically used for metallic articles. EBM utilizes a raw material in the form of a metal powder or a metal wire, which is placed under a vacuum (e.g., within a vacuum sealed build chamber). Generally, the raw material is fused together from heating via an energy beam.

The raw material used to form the article is not limited by the present disclosure and may generally be any raw material used for EBM now known or later developed. Illustrative examples of raw material include, but are not limited to, pure metals such as titanium, aluminum, tungsten, or the like; and metal alloys such as titanium alloys, aluminum alloys, stainless steel, cobalt-chrome alloys, cobalt-chrome-tungsten alloys, nickel alloys, and/or the like. Specific examples of raw material include, but are not limited to, Ti6Al4V titanium alloy, Ti6Al4V ELI titanium alloy, Grade 2 titanium, and ASTM F75 cobalt-chrome (all available from Arcam AB, Mölndal, Sweden). Another specific example of raw material is INCONEL® alloy 718 available from Special Metals Corporation (Huntington, WV).

In embodiments, the raw material is pre-alloyed, as opposed to a mixture. This may allow classification of EBM with selective laser melting (SLM), where other technologies like selective laser sintering (SLS) and direct metal laser sintering (DMLS) require thermal treatment after fabrication. Compared to selective laser melting (SLM) and DMLS, EBM has a generally superior build rate because of its higher energy density and scanning method.

Systems that utilize EBM generally obtain data from a 3D computer-aided design (CAD) model and use the data to place successive layers of the raw material using an apparatus to spread the raw material, such as a powder distributor. The successive layers are melted together utilizing a computer-controlled energy beam. The process takes place under vacuum within a vacuum sealed build chamber, which makes the process suited to manufacture parts using reactive materials having a high affinity for oxygen (e.g., titanium). In embodiments, the process operates at higher temperatures (up to about 1000° C.) relative to other additive manufacturing processes, which can lead to differences in phase formation though solidification and solid-state phase transformation. At these higher temperatures, care must be taken to ensure that temperature fluctuations remain within a predetermined range to ensure correct formation of a component.

One way to ensure the correct formation of a component is to provide an apparatus for in-situ inspection. X-rays may be generated by an electron beam, such as the electron beam of the EBM machine, that contact the powder bed or part. These x-rays may project an image of the electron beam spot size and shape, but the x-rays do not capture information regarding defects in layers below the top surface of the powder bed or part. That is, the x-rays do not penetrate a plurality of layers of the already formed part. This is because electron penetration depth may be too small to be able to see defects in solidified material below the melt-pool. Accordingly, in-situ inspection technology with the ability to interact with an inner volume of the solid material of an additively manufactured articles may be desired.

Disclosed herein are apparatuses, systems, and methods that overcome the aforementioned defects in in-situ inspection of additively manufactured components. Using the principles of x-ray backscattering, an x-ray beam may be generated using the same electron beam of the EBM machine that is used for melting the powder bed. The electron beam may be deflected towards a target to generate an x-ray flux, which is directed through a pinhole to reach the surface of the build part in the form of a small spot and interact with the solid material of the component several layers deep below its surface providing images of potential defects (e.g., voids, pores, lack-of-fusion, etc.). A detector positioned to detect the resulting x-ray radiation provides three-dimensional, spatial coordinates that may correspond to a defect in the component. That is, the x-ray radiation generated from the x-ray flux that penetrates the component is converted to coordinates that correspond to a spatial reference including a three-dimensional area of the component. The depth of the x-ray penetration is dependent upon the energy of the initial x-ray beam. The in-situ inspection apparatuses, systems, and methods described herein will improve quality and yield, allow for the fixing of defects during the build, and also reduce post-inspection cost and time.

More specifically, an exemplary imaging device described herein detects x-rays generated during EBM. During EBM, an electron beam pre-heats a material, fuses the material, and anneals the material into a shape of a near-final shape metal part. High energy electrons interact with the material during the process and produce x-ray radiation which originates in the volume of the material through processes such as Bremsstrahlung radiation and x-ray fluorescence. Additionally, the same electrons used to manufacture the material can be used to generate x-rays for additional inspection. The illustrative imaging device described herein includes an x-ray detector that images the component by detecting generated x-rays that emanate from a work surface as a result of impingement of x-ray flux thereon. The x-rays reveal undesirable subsurface features not normally detectable by surface-only imaging devices. Through use of x-rays, undesirable subsurface features such as voids, cracks, and porosity are identified. By identifying these subsurface features early in the additive manufacturing process, the manufacturing process can be adjusted to fix the features and allow for early detection of an unusable component, increasing manufacturing efficiencies.

Additionally, embodiments of x-ray imaging systems for use with an additive manufacturing component, as described herein, overcome a number of deficiencies of known imaging systems and provide a cost-effective method for identifying undesirable features during the additive manufacturing process. Specifically, the embodiments described herein replace known imaging systems such as computed tomography (CT) scan systems and digital x-ray systems that are limited as to the size of the component that may fit within the scanning system after its manufacturing. Additionally, the embodiments described herein replace ultrasound imaging systems that require the component surface to be finished. These known systems lead to undesirable subsurface features not being detected for large components or not being detected until after the component is manufactured. Additionally, some of these known post-build inspection devices such as, but not limited to, CT scans, may be too large to equip within an additive manufacturing process. These inspection devices may also be costly to implement in an existing system. The illustrative imaging systems described herein include an x-ray device that images a localized predetermined area of the component through use of x-rays. In some embodiments, these images are combined to form a complete representation of the component. Through use of the x-ray system, undesirable subsurface features such as voids, cracks, and porosity are identified for large additive manufactured components. As such, the size of the component does not determine what imaging technique to use, as the imaging system size is not a factor. In addition, the surface of component does not need to be finished before imaging, decreasing manufacturing costs for undesirable components.

In one aspect, an apparatus for in-situ inspection includes an electron emitter configured to emit radiation at one or more wavelengths in x-ray spectrum such that the radiation penetrates a component, wherein the electron moves along an electron path between the electron emitter and the component. The apparatus further includes a target positioned along the electron path between the electron emitter and the component at an angle with respect to the component such that interaction between the target and the electron generates a multidirectional x-ray flux. A plate defining a pinhole therethrough is positioned along the electron path between the target and the component such that the multidirectional x-ray flux is directed through the pinhole toward the component positioned with respect to the angle to direct an x-ray flux onto the component. At least one detector is positioned to detect x-ray radiation from the x-ray flux that penetrates the component, wherein the x-ray radiation is converted to coordinates that correspond to a spatial reference including a three-dimensional area of the component.

In another aspect, the electron emitter may be an electron gun that includes at least at least one astigmatism coil, at least one focusing coil, or at least one deflection coil, or a combination thereof.

In another aspect, the apparatus may further include an enclosure surrounding the target and the plate such that the at least one detector is disposed outside of the enclosure.

In another aspect, the apparatus may further include a bending coil configured to deflect the electron emitted from the electron emitter to the target, wherein the bending coil is positioned along the electron path between the electron emitter and the target.

In yet another aspect, the apparatus may further include a second plate defining a second pinhole therethrough positioned between the part and the at least one detector such that the x-ray radiation passes through the second pinhole prior to detection by the at least one detector.

In yet another aspect, the coordinates may further include a depth of the component such that the at least one detector may generate images of one or more voids, pores, trapped powder, porosity, cracks or lack-of-fusion within the component.

In yet another aspect, the apparatus may further include an arm configured to move a transmission target horizontally, wherein the transmission target comprises the target and a low-density material, wherein the angle with respect to the component is at or near 0° such that the transmission target is parallel to the component.

Referring now to the figures, FIG. 1 depicts an illustrative embodiment of the present disclosure that includes an additive manufacturing system 100 for in-situ inspection that is schematically depicted in cross-section. In embodiments, the additive manufacturing system 100 includes a process chamber 150 for manufacturing a component 126 and an apparatus for in-situ inspection. In the illustrative embodiment, the apparatus for in-situ inspection is within an EBM additive manufacturing system. In alternative embodiments, the additive manufacturing system 100 may be any other suitable additive manufacturing system, including, without limitation, one of a Direct Metal Laser Sintering (DMLS) system, a Direct Metal Laser Melting (DMLM) system, a Selective Laser Sintering (SLS) system, a Direct Metal Laser Deposition (DMLD) system, a Direct Metal Laser Deposition (DMLD) system, and a LaserCusing® system.

The additive manufacturing system 100 includes a process chamber 150 together with various other components of the additive manufacturing system. The process chamber 150 defines an interior 151 that is separated from an exterior environment 153 via one or more chamber walls 175 having an interior surface 173 thereof. In some embodiments, the interior 151 of the process chamber 150 may be a vacuum sealed interior such that the component 126 formed within the process chamber 150 is formed under optimal conditions for EBM, as is generally understood. The process chamber 150 is capable of maintaining a vacuum environment via a vacuum system (not shown). Illustrative vacuum systems may include, but are not limited to, a turbo molecular pump, a scroll pump, an ion pump, and one or more valves, as are generally understood. In some embodiments, the vacuum system may be communicatively coupled to an analysis component 190 such that the analysis component 190 directs operation of the vacuum system to maintain the vacuum within the interior 151 of the process chamber 150. In some embodiments, the vacuum system may maintain a base pressure of about $1\times10^{-5}$ mbar or less throughout an entire build cycle. In further embodiments, the vacuum system may provide a partial pressure of He to about $2\times10^{-3}$ mbar during a melting process. In other embodiments, the process chamber 150 may be provided in an enclosable chamber provided with ambient air and atmosphere pressure. In yet other embodiments, the process chamber 150 may be provided in open air.

The process chamber 150 generally includes a build envelope (not shown) supporting the component 126 and powder thereon, as well as a powder distributor (not shown) within the interior 151. In some embodiments, the process chamber 150 may further include one or more raw material hoppers (not shown) that maintain raw material therein. The process chamber 150 may further include other components, particularly components that facilitate EBM, including components not specifically described herein. It should be appreciated that the other components are omitted from FIG. 1 for the purposes of clarity.

The additive manufacturing system 100 includes an electron beam (EB) source 101 configured to emit electron at one or more wavelengths in x-ray spectrum such that the electron beam penetrates the component 126, wherein the electron beam moves along an electron beam path between an emitter 103 of the EB source 101 and the component 126. In embodiments, the electron beam path may be defined by a beam 105 generated by the EB source 101. The electron beam path is deflected or angled after exiting the EB source 101 such that the electron beam path follows the path of a deflected beam 107.

In embodiments, the EB source 101 may generally be a device that emits electrons such as an electron beam (e.g., a charged particle beam), an electron gun, a linear accelerator, or the like. The emitter 103 generates the beam 105 that may be used for melting or fusing together the raw material when spread as a powder layer on a build platform. The beam 105 may also generate x-ray flux 108 for in-situ inspection of the component 126 by bombardment with a target 120.

In some embodiments, the EB source 101 may include the emitter 103, at least one focusing coil 112, and at least one deflection coil 117. In some embodiments, the EB source 101 may further include at least one astigmatism coil 110 (e.g., a stigmator). In still other embodiments, the EB source 101 may include a power supply (not shown), which may be electrically connected to at least one gun control unit 160, the electron emitter 103, the at least one astigmatism coil 110, the at least one focusing coil 112, and/or the at least one deflection coil 117. In some embodiments, the various components of the EB source 101 are arranged such that the at least one astigmatism coil 110, the at least one focusing coil 112, and the at least one deflection coil 117 are positioned relative to the emitter 103 such that electrons emitted by the emitter 103 are passed through a void defined by each of the coils 110, 112, 117. In the embodiment depicted in FIG. 1, the at least one astigmatism coil 110 may be positioned closest to the emitter 103 relative to the at least one focusing coil 112 and the at least one deflection coil 117, the focusing coil 112 may be positioned closer to the emitter 103 relative to the at least one deflection coil 117, and the at least one deflection coil 117 may be positioned farthest away from the emitter 103. However, this is merely illustrative, and other positions of the various coils relative to the emitter 103 are contemplated and included within the scope of the present disclosure.

In the illustrative embodiment, the gun control unit 160 implemented using one or more electronic computing devices. Such devices typically include at least one processing device (not shown) such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, or any other circuit or processing device capable of executing the functions described herein. The methods described herein may be encoded as executable instructions embodied in a computer readable medium, including, without limitation, a non-transitory storage device or a memory device coupled to the at least one processor. Such instructions, when executed by the controller or processing device, cause the controller or processing device to perform at least some of the method steps described herein. Although the gun control unit 160 is illustrated as a discrete system, the gun control unit 160 may be implemented at least partially by any other suitable computing devices. The above examples are illustrative only, and thus are not intended to limit in any way the definition or meaning of the terms controller and processing device.

For example, in certain embodiments, the gun control unit 160 is configured to operate at least the EB source 101 using preselected operating parameters that result in the creation of the component 126. For example, in one embodiment, the preselected operating parameters may include a power of the beam 105 generated by the EB source 101 in a range from about 100 watts to about 6,000 watts such that a thickness of each fused layer of the component 126 is in a range from about 10 micrometers to about 200 micrometers.

The emitter 103 is generally an electron beam emitting component containing a filament/cathode and/or an anode electrically coupled to the power supply via the gun control unit 160. The emitter 103 emits electrons into free space generally in a direction towards a space defined in the center of the coils 110, 112, 117 as a result of application of an electric current generated by the power supply. That is, the electrons emitted by the emitter 103 are generally directed in the direction indicated by the beam 105 in FIG. 1. In some embodiments, to ensure a directed emission of electrons therefrom, the emitter 103 may be formed into a particular shape that is adapted for such an electron emission. For example, the emitter 103 may be formed in a loop, as a tip having a particular radius of curvature, as one or more legs spaced apart from one another, and/or the like. The emitter 103 may be constructed of a particular material for emitting electrons, such as tungsten (W), lanthanum hexaboride ($LaB_6$), or the like. In some embodiments, the emitter 103 may be formed as the result of an etching process. An illustrative electron emitter may be provided by Energy Beam Sciences, Inc. (East Granby, CT). In one illustrative embodiment, the emitter 103 may produce a focusable electron beam with an accelerating voltage of about 60 kilovolts (kV) and with a beam power in the range of about 0 kilowatts (kW) to about 10 kW. It should be understood that the various features of the emitter 103 are merely illustrative, and that other features are also contemplated.

The at least one focusing coil 112 is generally a coil of electrically conductive material that has a plurality of turns/windings and is electrically coupled to a power source (e.g., the power supply). The at least one focusing coil 112 is positioned relative to the emitter 103 such that electrons emitted by the electron emitter are passed through a center of the at least one focusing coil 112 (e.g., a void defined by the plurality of turns/windings of the at least one focusing coil 112). That is, the at least one focusing coil 112 is oriented transverse to an axis defined by the beam 105 depicted in FIG. 1. The arrangement and location of the at least one focusing coil 112 relative to the emitter 103 and/or the shape and size of the plurality of turns/windings may be such that, when an electrical current is applied across the at least one focusing coil 112, a magnetic field is generated in the void defined by the turns/windings. The magnetic field acts as a lens for the electrons emitted by the emitter 103, converging the electrons into an electron beam having a single focal point. As such, modification of the electrical current applied across the at least one focusing coil 112 alters the magnetic field, which in turn alters the focal point of the electron beam. In some embodiments, the at least one focusing coil 112 may be referred to as a "focusing lens" (e.g., a focusing electromagnetic lens).

The at least one deflection coil 117 is generally a coil of electrically conductive material that has a plurality of turns/windings and is electrically coupled to a power source (e.g., the power supply). The at least one deflection coil 117 is positioned relative to the emitter 103 and/or the at least one focusing coil 112 such that electrons emitted by the emitter 103 and focused into a beam by the at least one focusing coil 112 are passed through a center of the at least one deflection coil 117 (e.g., a void defined by the plurality of turns/windings of the at least one deflection coil 117). That is, the at least one deflection coil 117 is oriented transverse to an axis defined by the beam 105 depicted in FIG. 1. The arrangement and location of the at least one deflection coil 117 relative to the emitter 103 and/or the at least one focusing coil 112 and/or the shape and size of the plurality of turns/windings may be such that, when an electrical current is applied across the at least one deflection coil 117 a magnetic field and/or an electrical field is generated in the void defined by the turns/windings. The magnetic field and/or electrical field acts to direct the electron beam emitted by the emitter 103 and focused by the at least one focusing coil 117, causing the electron beam to be directed to a particular location based on the characteristics of the magnetic field and/or electrical field. As such, modification of the electrical current applied across the at least one deflection coil 117 alters the magnetic field and/or electrical field, which in turn alters the path of travel of the electron beam. For example, the at least one deflection coil 117 may alter the path of travel of the beam 105 to a deflected beam 107. In some embodiments, the at least one deflection coil

117 may be referred to as a "deflection lens" (e.g., a deflecting electromagnetic lens).

The at least one astigmatism coil 110 is generally a coil of electrically conductive material that has a plurality of turns/windings and is electrically coupled to a power source (e.g., the power supply). The at least one astigmatism coil 110 is positioned relative to the emitter 103 such that electrons emitted by the emitter 103 are passed through a center of the at least one astigmatism coil 110 (e.g., a void defined by the plurality of turns/windings of the at least one astigmatism coil 110). That is, the at least one astigmatism coil 110 is oriented transverse to an axis defined by the beam 105 depicted in FIG. 1. The arrangement and location of the at least one astigmatism coil 110 relative to the emitter 103 and/or the shape and size of the plurality of turns/windings may be such that, when an electrical current is applied across the at least one astigmatism coil 110, a magnetic field is generated in the void defined by the turns/windings. The magnetic field acts to correct any focus defects present in the electrons emitted by the emitter 103, causing the electrons to converge in a beam that is radially uniform. As such, modification of the electrical current applied across the at least one astigmatism coil 110 alters the magnetic field, which in turn alters the electron beam distortion. In some embodiments, the at least one astigmatism coil 110 may be referred to as an "astigmatism lens" (e.g., an astigmatic electromagnetic lens).

Figure 5:
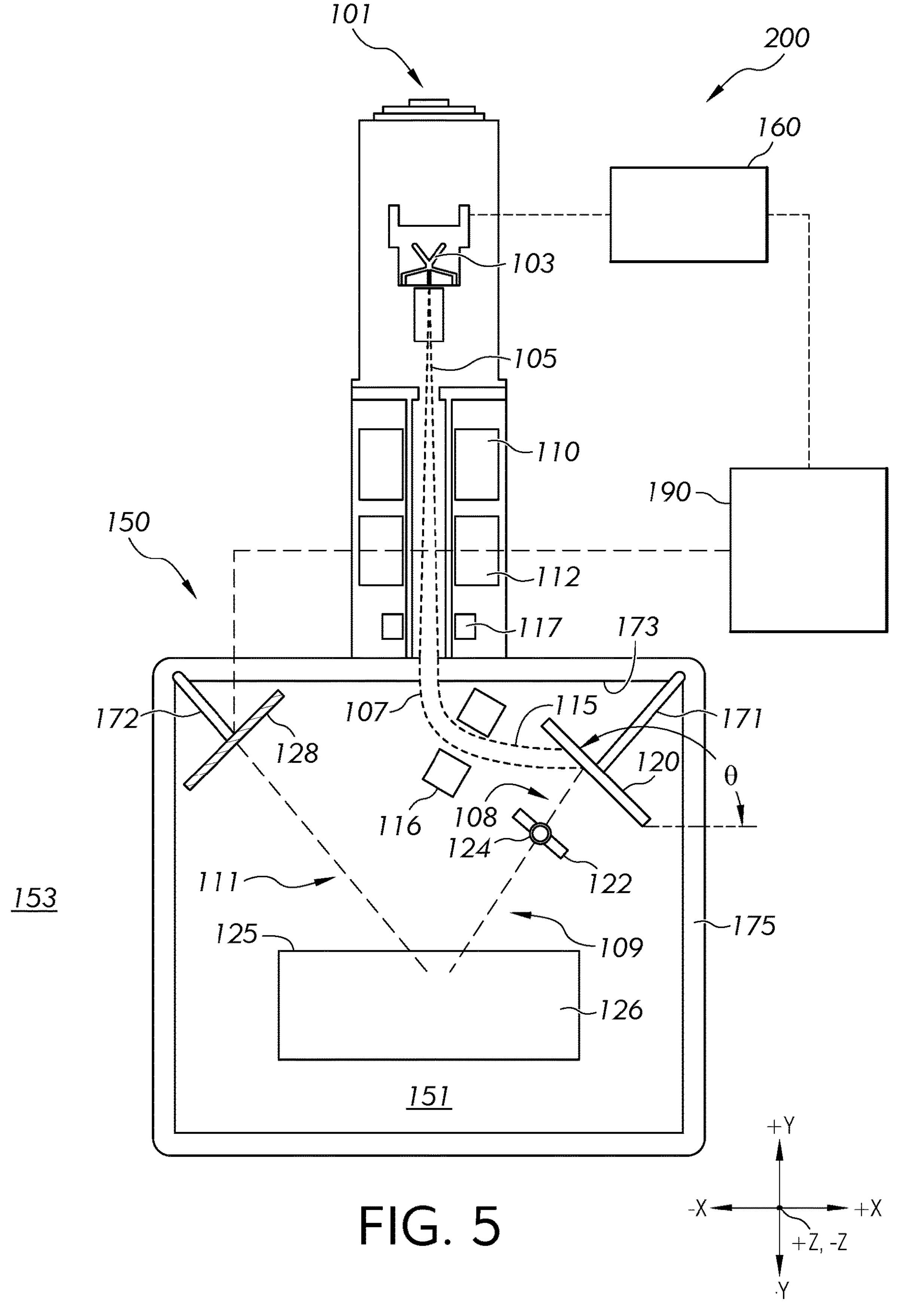
FIG. 5 schematically depicts a cross-section view of another illustrative machine core of an additive manufacturing machine according to one or more aspects shown and described herein.

While the embodiment of FIG. 1 depicts three coils (e.g., the at least one astigmatism coil 110, the at least one focusing coil 112, and the at least one deflection coil 117), it should be understood that this is merely illustrative. Fewer or additional coils may be included within the EB source 101, such as is depicted in FIG. 5, without departing from the scope of the present disclosure. In one particular embodiment, the EB source 101 may include six coils therein, where at least one of the six coils is a focusing coil and at least one of the six coils is a deflection coil.

The power supply is generally any component that provides electrical power to the components of the EB source 101 (e.g., the emitter 103, the at least one astigmatism coil 110, the at least one focusing coil 112, and/or the at least one deflection coil 117). The power supply may have a plurality of power outputs, each of the plurality of power outputs coupled to one of the components of the EB source 101. As such, the power supply can modulate the electricity provided to each of the component of the EB source 101 independently of one another. That is, a first voltage, frequency, and/or the like can be provided to a first component of the EB source 101 and a second voltage, frequency, and/or the like can be provided to a second component of the EB source 101. Control of the electricity provided to the various components of the EB source 101 may be achieved by the gun control unit 160, which is electrically coupled to the power supply and/or each of the components of the EB source 101 (e.g., the emitter 103, the at least one astigmatism coil 110, the at least one focusing coil 112, and/or the at least one deflection coil 117). That is, the gun control unit 160 controls the electricity provided to each of the components of the EB source 101 to ensure that a particular voltage, a particular frequency, and/or the like is supplied to each component of the EB source 101 to ensure a particular control of the characteristics of the electron beam emitted by the EB source 101.

In some embodiments, the power supply is a Tesla transformer, as it produces multi-megavolt pulses of very high power (e.g., on the order of tens of megawatts). In embodiments, the pulse repetition rate may be about twice the frequency of the supply mains, and may be limited only by a deionization time of a single spark-gap switch. When a high-voltage pulse is applied by the power supply, driving a cathode of the electron emitter 103 to a large negative potential, the electric field at the cathode face becomes so great that emission of electrons occurs. The electrons may be released normal to the face of the cathode and are accelerated through an evacuated region of a gun barrel of the EB source 101 by the electric field of the cathode through the magnetic fields and/or electrical fields produced by the various coils 110, 112, 117.

It should be understood that the EB source 101 may include other components that are not specifically recited herein. In a nonlimiting example, the EB source 101 may further include one or more focusing lens, one or more astigmatic lenses, one or more deflection lenses, one or more bending coils, one or more pumps (e.g., turbo pumps), one or more gate valves, one or more apertures, and/or the like. In some embodiments, the EB source 101 may include a plurality of columns (e.g., an upper column arranged above a lower column). Such columns may include a pressure differential therebetween (e.g., a pressure differential of about $10^{-4}$ mBar).

In some embodiments, the process chamber 150 includes a target 120 positioned along an electron path between the emitter 103 and the component 126 at an angle θ with respect to the component 126 such that interaction between the target 120 and the deflected beam 107 generates a multidirectional x-ray flux 108. The electron path between the emitter 103 and the component 126 may be defined by the deflected beam 107.

The multidirectional x-ray flux 108 is generated by bombarding a target, or anode, with high-energy electrons. The energy of the emitted x-ray flux depends on the anode material, and the beam intensity depends on the electron current striking the anode and its energy. Energetic electrons are slowed down in matter by collisions and excitation interactions, and x-ray flux is emitted as the electrons slow down (decelerate) in the metal. This occurs because when an electron comes close to an atomic nucleus (such as, for example, an atomic nucleus within the target 120), the attractive Coulomb force causes a change in the electron's trajectory. An accelerated electron or an electron changing its direction emits electromagnetic radiation, also known as Bremsstrahlung radiation.

The target 120 may generally be positioned at various locations on the interior surface 173 of the one or more interior surfaces 173 of the chamber walls 175 via attachment 171 and positioned such that the target 120 directs the deflected beam 107 to any point on the component 126. For example, FIG. 1 depicts the angle θ as 90° such that the target 120 is perpendicular to the x-axis and the component 126. It should be understood that the angle θ of the target 120 may be adjusted to direct the deflected beam 107 to any point of the component 126. Additionally, the target 120 may be located at various points along the positive or negative x-axis such that the deflected beam 107 may be directed to any point on the component 126. It is further contemplated that the target 120 could remain in a single position, and the deflected beam 107 may be adjusted to hit the target 120 in different locations, resulting in various angles (not shown) of x-ray flux 108 with respect to the component 126. The target 120 may be a plate formed from, for example, tungsten, molybdenum, tungsten and rhenium, molybdenum and rhenium, rhodium, niobium, zirconium, and combinations or alloys thereof. Generally, these materials have high melting points, high Z-values, and are known in the art to be favorable materials to generate X-rays when irradiated with a high-speed electron beam.

The process chamber 150 further includes a plate 122 defining a pinhole 124 therethrough, positioned along the electron path between the target 120 and the component 126 such that the multidirectional x-ray flux 108 is directed through the pinhole 124 toward the component 126 positioned with respect to the angle θ to direct an x-ray flux 109 onto the component 126. The x-ray flux 109 reaches the surface on the component 126 and interacts with the solid material of the component 126 several layers below the surface. The plate 122 may be a flat rectangular shape, and the pinhole may be a hole sized from about 100 micrometers (μm) to about 1 millimeter (mm) on the plate. In embodiments, the pinhole 124 may be from about 50 μm to about 1 mm. In embodiments, there may be more than one pinhole 124 within the plate 122 such that x-ray flux may be directed to a plurality of areas.

X-ray radiation 111 forms from the interaction and is detected by at least one detector 128 positioned to detect the x-ray radiation 111 generated from the x-ray flux 109 that penetrates the component 126, wherein the x-ray radiation 111 is converted to coordinates that correspond to a spatial reference including a three-dimensional area of the component 126. The detector 128 may be positioned within the process chamber 150, as is depicted in FIG. 1, via attachment 172. However, it is also contemplated that the detector 128 may be positioned external to the process chamber 150 and configured to detect the X-ray radiation 111 through a window or the like in the chamber walls 175.

The plate 122 may generally be positioned at various locations within the process chamber 150 such that the multidirectional x-ray flux 108 can be directed to any point on the component 126 through the pinhole 124. The plate 122 may be attached to the interior surface 173 of the build chamber. The plate 122 may have a pinhole 124 therethrough that may have a diameter greater than or equal to 50 μm, 250 μm, 500 μm, 750 μm, or 1000 μm.

Figure 2:
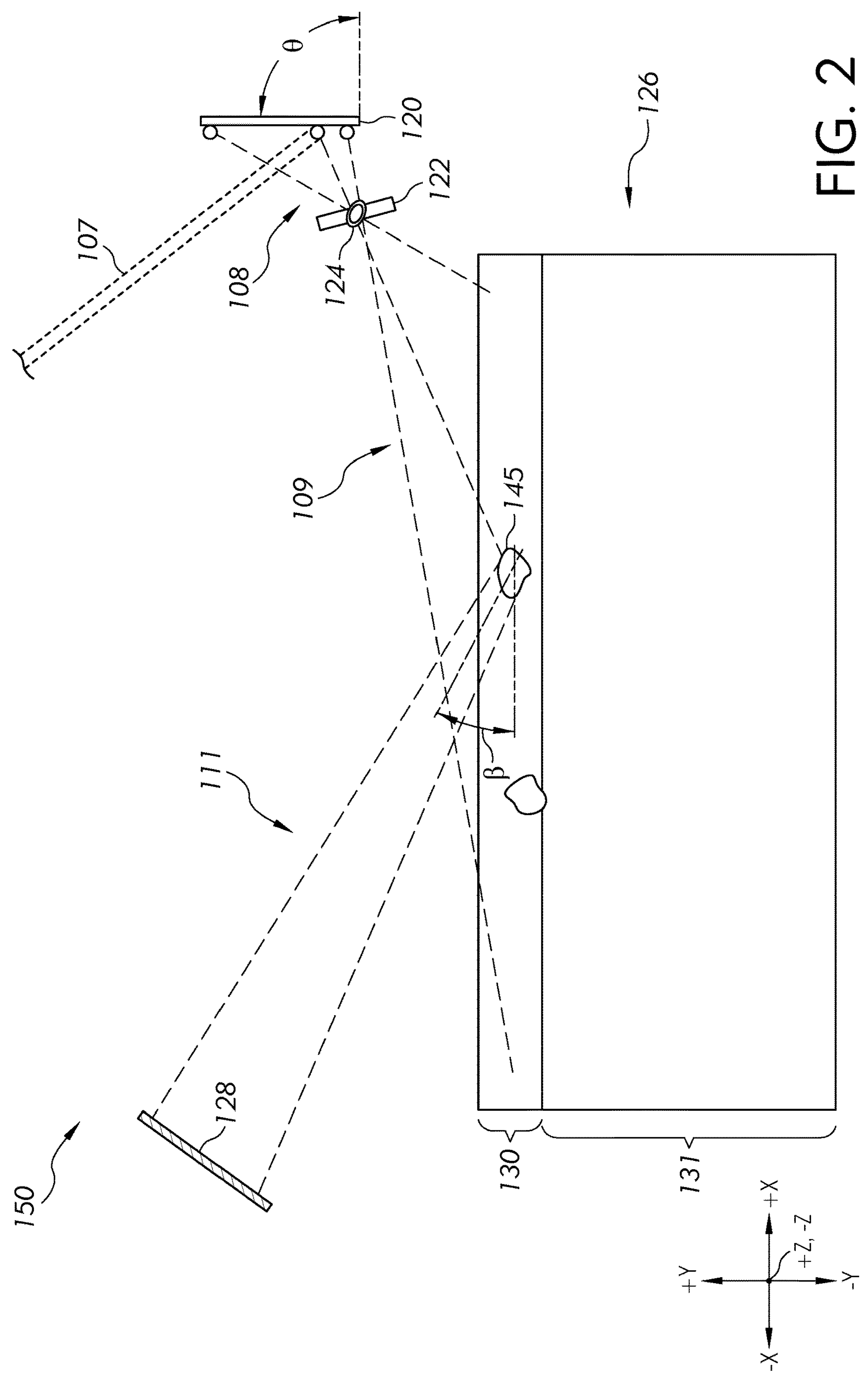
FIG. 2 schematically depicts a cross-section view of an illustrative backscatter radiation imaging system for in-situ part inspection within an additive manufacturing machine, according to one or more aspects shown and described herein.

Now referring to FIG. 2, a detailed cross-section of a portion of the process chamber 150 is shown. As depicted in FIG. 2, the component 126 includes at least two portions such as an interaction layer 130 disposed on a fused material layer 131. The interaction layer 130 generally refers to a layer of material that is in the process of being formed according to the processes described herein, and the fused material layer 131 represents material that has previously been formed and inspected. As such, the interaction layer 130 is generally disposed on top of (e.g., when moving in the ty direction of the coordinate axes of FIG. 2) the fused material layer 131. Further, FIG. 2 schematically depicts the x-ray flux 109 impinging on the interaction layer 130 of the component 126 for in-situ inspection, which results in x-ray radiation 111 emanating therefrom, as indicated by dashed lines extending between the interaction layer 130 of the component 126 and the detector 128 within the interior 151 of the process chamber 150.

The deflected beam 107 is directed toward the target 120, and multidirectional x-ray flux 108 is generated via interactions of the bombardment of the electrons of the deflected beam 107 with the target's atom. The target 120 in FIG. 2 is depicted to be at a 90° angle with respect to the component 126, resulting in the multidirectional x-ray flux 108 traveling along various the electron paths depicted in FIG. 2 defined by the dashed lines of the multidirectional x-ray flux 108. The plate 122 directs the multidirectional x-ray flux 108 through the pinhole 124. Said differently, only part of the multidirectional x-ray flux 108 is directed through the pinhole 124 as x-ray flux 109, toward the component 126. to produce the x-ray flux 109 that reaches the interaction layer 130 of the component 126. The x-ray flux 109 interacts with the solid material of the component 126 within the interaction layer 130. The thickness of the interaction layer 130 that the x-ray flux 109 may interact with depends upon the x-ray penetration depth, which depends on the energy of the electron beam 105 (FIG. 1).

In operation, variation in processing may form undesirable subsurface features within interaction layer 130. For example, undesirable subsurface features may include, but are not limited to, a void defined within the interaction layer 130, a crack defined within the interaction layer 130, or porosity within the interaction layer 130. In FIG. 2, a defect 145 represents any of the named undesirable subsurface features, but is not limited to, such undesirable subsurface features.

X-ray radiation 111 emanating from the component 126 around the undesirable subsurface feature (defect 145) as a result of impingement of the x-ray flux 109 is detected by the detector 128. X-ray radiation 111 detected at angle(s) β can then be used to reverse trace the path of x-ray radiation 111 through triangulation, for example, by the analysis component 190, to create a model of the interaction layer 130 or the undesirable feature (in FIG. 2, defect 145). Accordingly, the type, size, and depth of the undesirable feature may be identified and determined. The detector 128 can measure an interaction volume corresponding to the path of the x-ray radiation 111, which corresponds to the build height of defect 145, and report to the analysis component 190. If the defect 145 is detected by the detector 128, corrective action may be taken when the next build layer(s) is sintered to modify or correct the undesirable feature. This process may be repeated as each of the plurality of layers is manufactured. Corrective action may be, but is not limited to, pausing the build to re-melt unfused powder, executing machine-readable instructions to re-build a layer of the component 126, and the like.

In an additional embodiment, a plurality of digital x-ray panels facilitate capturing x-ray radiation 111 at different angles β. For example, a plurality of digital x-ray panels can capture x-ray radiation 111 generated around the defect 145 from angle β to create an image. These images can then be used to reverse trace the path of x-ray radiation 111 through triangulation, for example, by the analysis component 190, to create a model of the interaction layer 130 or the defect 145. Additionally, through use of a plurality of digital x-ray panels, the type, size, and depth of the undesirable feature may be identified and determined.

An image processing software runs on the machine computer in real time to reconstruct the three-dimensional image of the build part as the analysis component receives information and data regarding the defect 145 derived from the emanation of the radiation from the component 126 that is helpful to repair and fix undesirable anomalies. It is contemplated that repairs may be made during the build when possible, consistent with the corrective action methods mentioned above. That is, when a defect 145 is detected by the analysis component 190 during the build, the analysis component 190 can direct the build to stop while the defect 145 is corrected. For example, the defect 145 may be removed, the build may be adjusted to account for the defect 145, or the like. In this way, the component 126 may avoid undesirable defects upon completion of the build. Additionally, the analysis component 190 and the image processing software generate a full, three-dimensional volumetric characterization report at the end of the build. Parts that do not pass the quality control requirements can be eliminated from further post-processing steps. This may help improve quality and yield by allowing defects to be addressed during the build and also to reduce post-inspection cost and time.

While FIG. 2 depicts one detector 128 within the interior 151 of the process chamber 150, the present disclosure is not limited to such. That is, a plurality of detectors 128 may be included within the interior 151 of the process chamber 150 without departing from the scope of the present disclosure. The use of the singular term throughout the disclosure does not preclude the non-singular embodiments contemplated here. The detector 128 may be positioned at any location with respect to other measuring devices (if any). In embodiments, the detector 128 may be located outside an interior 151 of the process chamber 150 (e.g., in the exterior environment 153) so as to not expose the detector 128 to the harsh conditions of the process chamber 150.

Referring to FIGS. 1 and 2, the detector 128 is generally a device that is communicatively coupled to one or more components of the additive manufacturing system 100 (e.g., target 120, and/or the EB source 101) and is particularly arranged and configured to transmit and/or receive signals and/or data to/from the one or more components of the additive manufacturing system 100.

The detector 128 includes at least one digital x-ray panel coupled to the analysis component 190. In the illustrative embodiment, the detector 128 is positioned at a stationary location within the process chamber 150. In alternative embodiments, the detector 128 includes at least one digital x-ray panel that is positionable, by the analysis component 190, within the additive manufacturing system 100. That is, in such embodiments, the detector 128 is not stationary, but rather can be oriented, moved, positioned, and/or the like at various locations of the additive manufacturing system 100 to image the component 126. Additional details regarding the analysis component 190 are discussed herein with respect to FIGS. 3A-3B.

Figure 3A:
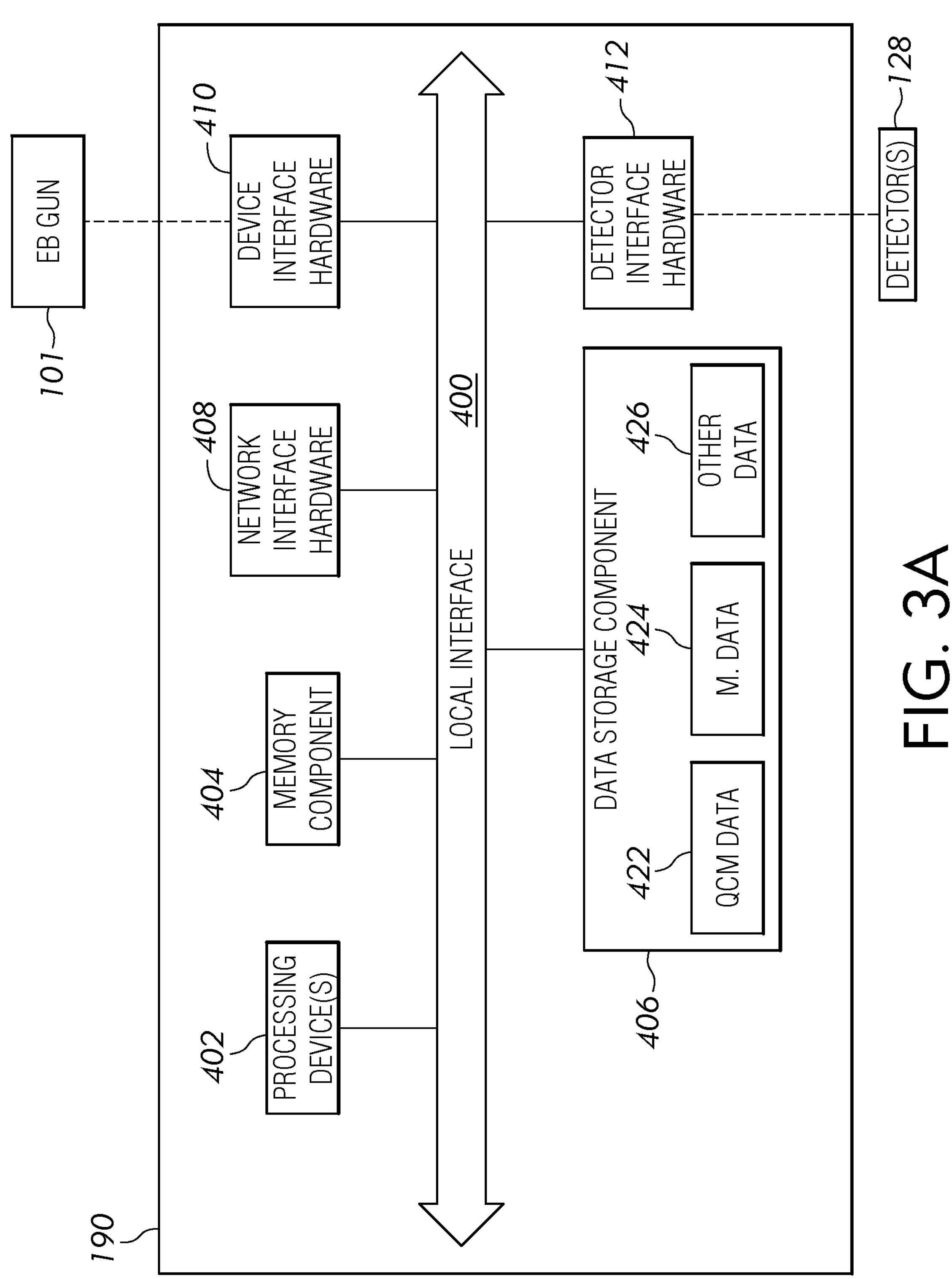
FIG. 3A schematically depicts a block diagram of illustrative components contained within a control unit according to one or more aspects shown and described herein.

Referring now to FIG. 3A, the various internal components of the analysis component 190 depicted in FIG. 1 are shown. Particularly, FIG. 3A depicts various system components for analyzing data received from the detector 128 of FIG. 1 and/or assisting with the control of various components of the additive manufacturing system 100 depicted in FIG. 1.

As illustrated in FIG. 3A, the analysis component 190 may include one or more processing devices 402, a non-transitory memory component 404, network interface hardware 408, device interface hardware 410, a data storage component 406, and/or detector interface hardware 412. A local interface 401, such as a bus or the like, may interconnect the various components.

The one or more processing devices 402, such as a computer processing unit (CPU), may be the central processing unit of the analysis component 190, performing calculations and logic operations to execute a program. The one or more processing devices 402, alone or in conjunction with the other components, are illustrative processing devices, computing devices, processors, or combinations thereof. The one or more processing devices 402 may include any processing component configured to receive and execute instructions (such as from the data storage component 406 and/or the non-transitory memory component 404).

The non-transitory memory component 404 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The non-transitory memory component 404 may include one or more programming instructions thereon that, when executed by the one or more processing devices 402, cause the one or more processing devices 402 to complete various processes, such as the processes described herein with respect to FIG. 11.

Figure 3B:
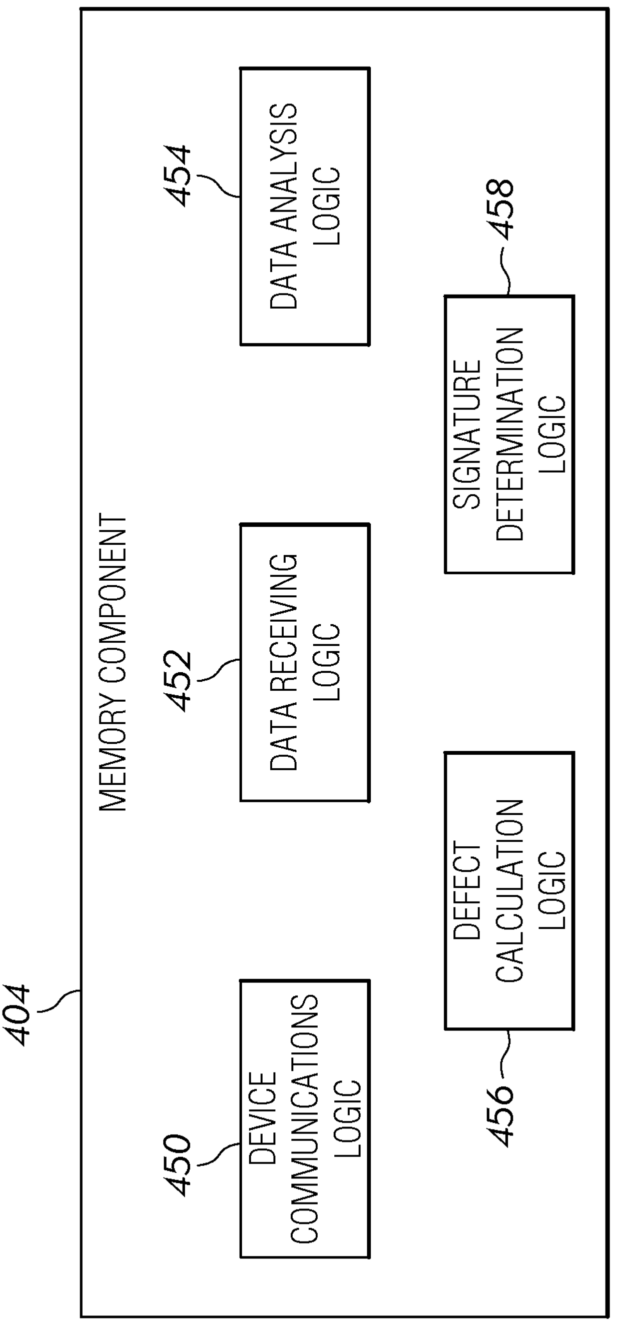
FIG. 3B depicts a block diagram of illustrative modules contained within a memory component of a control unit according to one or more aspects shown and described herein.

Still referring to FIG. 3A, the programming instructions stored on the non-transitory memory component 404 may be embodied as a plurality of software logic modules, where each logic module provides programming instructions for completing one or more tasks. FIG. 3B depicts the various modules of the non-transitory memory component 404 of FIG. 3A according to various embodiments.

As shown in FIG. 3B, the non-transitory memory component 404 includes a plurality of logic modules. Each of the logic modules shown in FIG. 3B may be embodied as a computer program, firmware, or hardware, as an example. Illustrative examples of logic modules present in the non-transitory memory component 404 include, but are not limited to, device communications logic 450, data receiving logic 452, data analysis logic 454, defect calculation logic 456, and/or signature determination logic 458. Other logic modules not specifically described herein are also contemplated and are included within the scope of the present disclosure.

Referring to FIGS. 1, 3A and 3B, the device communications logic 450 includes one or more programming instructions for causing a communications connection between one or more components of the additive manufacturing system 100 with one or more components of the analysis component 190. For example, the device communications logic 450 may include one or more programming instructions for directing communications between the detector 128 and the analysis component 190, directing communications between the EB source 101 and the analysis component 190, and/or the like. In another example, the device communications logic 450 may contain programming instructions for working in tandem with the programming instructions of the data receiving logic 452 to establish connections with the detector 128.

Still referring to FIGS. 1, 4A and 4B, the data receiving logic 452 includes one or more programming instructions for receiving data from the detector 128. That is, the data receiving logic 452 may cause a connection between the detector interface hardware 412 and the detector 128 such that data transmitted by the detector 128 (e.g., data pertaining to a defect in the volume of the component 126) is received by the analysis component 190. Further, the data transmitted by the detector 128 may be stored (e.g., within the data storage component 406).

Referring to FIGS. 1, 3A, and 3B, the data analysis logic 454 includes one or more programming instructions for analyzing the data received from the detector 128. That is, the data analysis logic 454 contains programming for analyzing the data pertaining to the x-ray radiation detected by the detector 128 that corresponds to the defect in the volume of the component 126, as described herein. The data analysis logic 454 may further include programming instructions for analyzing data continuously as the component 126 is formed (e.g., analyzing data in real-time as it is received during operation of the additive manufacturing system 100).

Still referring to FIGS. 1, 3A, and 3B, the defect calculation logic 456 may include programming instructions for determining, from the x-ray radiation data received from the detector 128, defects (if any) in the volume of the component 126, The defect calculation logic 456 may further include programming instructions for determining defects (if any) as the component 126 is formed (e.g., determining defects and/or changes in defects in real-time as it is received during operation of the additive manufacturing system 100).

Still referring to FIGS. 1, 3A, and 3B, the signature determination logic 458 may include programming instructions for determining what characteristics of the component 126 being formed (or a portion thereof) and/or parameters of various components of the additive manufacturing system 100 (e.g., parameters of the EB source 101 and/or components thereof) signify the change in defects (if any) determined by the programming instructions of the defect calculation logic 456, whether the defects determined by the programming instructions of the defect calculation logic 456 correspond to particular parameters (e.g., correct parameters, incorrect parameters, expected parameters, unexpected parameters, and/or the like). For example, the signature determination logic 458 may include programming instructions for retrieving correlation data from a database, determining whether the correlation data corresponds to the defect (or change in defect) determined by the defect calculation logic 456, and if the correlation data does not correspond to the defect (or change in defect), determine one or more reasons for why the correlation data does not correspond.

Referring again to FIG. 3A, the network interface hardware 408 may include any wired or wireless networking hardware, such as a modem, LAN port, wireless fidelity (Wi-Fi) card, WiMax card, long term evolution (LTE) card, mobile communications hardware, and/or other hardware for communicating with other networks and/or devices. For example, the network interface hardware 408 may be used to facilitate communication between external storage devices, user computing devices, server computing devices, external control devices, and/or the like via a network, such as a local network, the Internet, and/or the like, as described herein with respect to FIG. 4.

Referring to FIGS. 1 and 3A, the device interface hardware 410 may communicate information between the local interface 401 and one or more components of the additive manufacturing system 100 of FIG. 1, particularly the EB source 101. In some embodiments, the device interface hardware 410 may transmit or receive signals and/or data to/from the EB source 101, transmit control signals to the gun control unit 160 to effect control of the EB source 101 and/or components thereof (e.g., the coils 110, 112, 117 of the EB source 101, a power supply of the EB source 101, the emitter 103 of the EB source 101, and/or the like).

Referring again to FIG. 3A, the data storage component 406, which may generally be a storage medium, may contain one or more data repositories for storing data that is received and/or generated. The data storage component 406 may be any physical storage medium, including, but not limited to, a hard disk drive (HDD), memory, removable storage, and/or the like. While the data storage component 406 is depicted as a local device, it should be understood that the data storage component 406 may be a remote storage device, such as a server computing device, cloud based storage device, or the like. Illustrative data that may be contained within the data storage component 406 includes, but is not limited to, Quartz Crystal Microbalance (QCM) data 422, machine learning (ML) data 424, and/or other data 426. Referring also to FIG. 1, the QCM data 422 may generally be data that is generated and/or received as a result of detection of a defect by the detector 128. In some embodiments, the QCM data 422 may be generated by the analysis component 190 or by a combination of the detector 128 and the analysis component 190. In some embodiments, the QCM data 422 (or a portion and/or precursor thereof) may be transmitted by the detector 128.

Still referring to FIGS. 1 and 3A, the ML data 424 may be data that is generated as a result of one or more machine learning processes that are utilized as a result of or for the purposes of determining a defect (if any) of the component 126 by the detector 128 and corresponding characteristics of the component 126, as a result of or for the purposes of determining corresponding parameters of the various components of the additive manufacturing system 100 (e.g., parameters the EB source 101 and/or components thereof), as a means of determining what one or more characteristics of the component 126 and/or parameters of the various components of the additive manufacturing system 100 should be based on certain defects detected by the detector 128, and/or the like. For example, machine learning may be employed to assess whether a particular component 126 is properly formed based on any defects detected by the detector 128 at a particular point in time, changes in any defects detected by the detector 128 over a period of time, and/or the like. As such, data that allows a trained model to be formed may be stored as a portion of the ML data 424 in some embodiments.

Referring to FIGS. 1 and 3A, the detector interface hardware 412 may communicate information between the local interface 401 and the detector 128. In some embodiments, the detector interface hardware 412 may transmit or receive signals and/or data to/from each of the detector 128.

It should be understood that the components illustrated in FIG. 3A are merely illustrative and are not intended to limit the scope of this disclosure. More specifically, while the components in FIG. 3A are illustrated as residing within the analysis component 190, this is a nonlimiting example. In some embodiments, one or more of the components may reside external to the analysis component 190.

Figure 4:
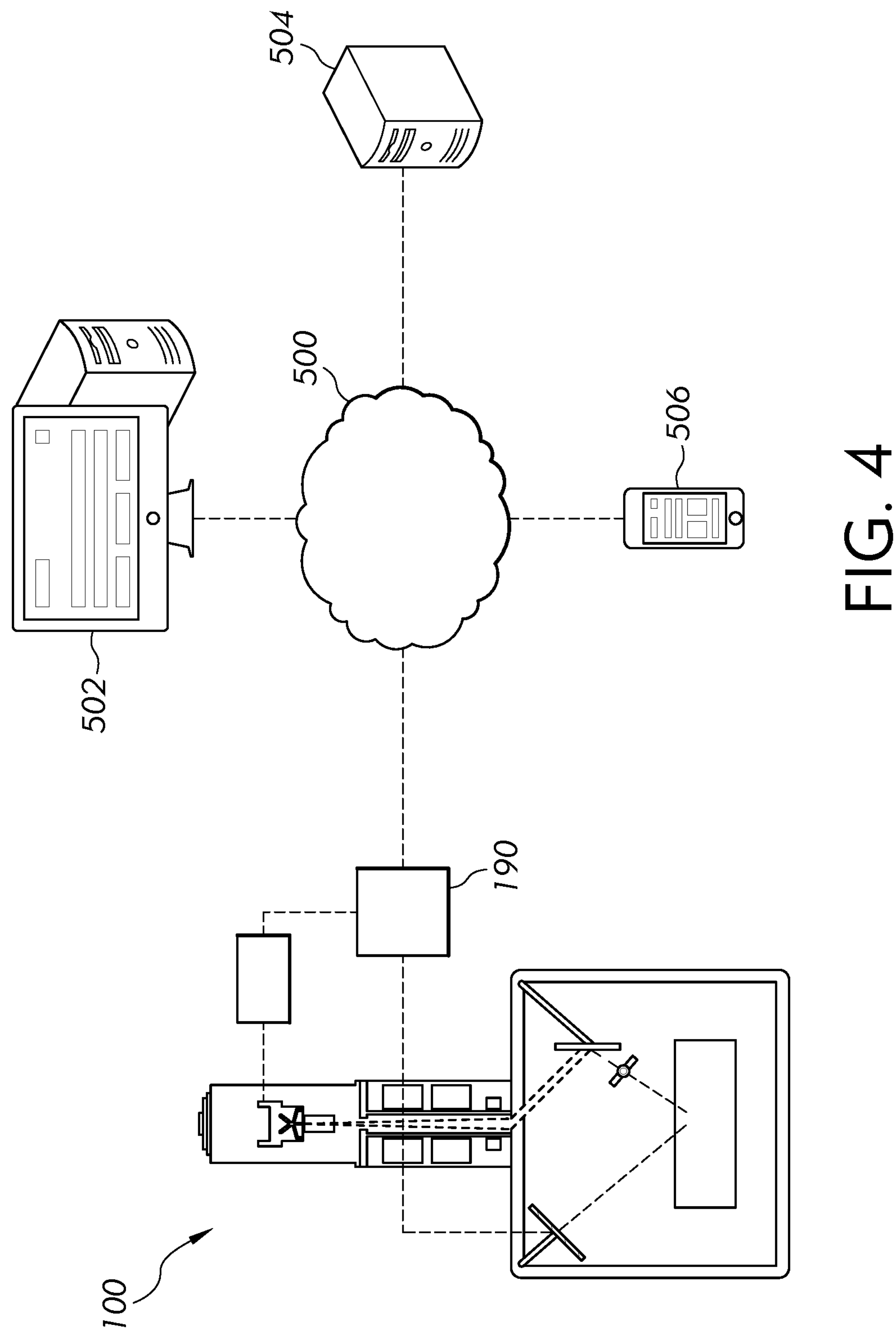
FIG. 4 depicts an illustrative control network according to one or more aspects shown and described herein.

Referring now to FIG. 4, an illustrative control network 500 is depicted. As illustrated in FIG. 4, the control network 500 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The control network 500 may generally be configured to electronically connect one or more systems and/or devices, such as computing devices, servers, electronic devices, additive manufacturing systems, and/or components of any of the foregoing. Illustrative systems and/or devices may include, but are not limited to, a user computing device 518, a database server 520, an electronic device 522, and/or the analysis component 190 of the additive manufacturing system 100 of FIG. 1.

Still referring to FIG. 4, the user computing device 518 may generally be used as an interface between a user and the other components connected to the control network 500. Thus, the user computing device 518 may be used to perform one or more user-facing functions, such as receiving one or more inputs from a user or providing information to the user. Accordingly, the user computing device 518 may include at least a display and/or input hardware. In the event that any of the other devices connected to the control network 500 (e.g., the database server 520, the electronic device 522, and/or the analysis component 190), requires oversight, updating, and/or correction, the user computing device 518 may be configured to provide the desired oversight, updating, and/or correction. The user computing device 518 may also be used to input data that is usable to determine a type of material being used for additive manufacture, various parameters for the additive manufacturing system 100 (or a component thereof), a desired strategy for forming an article using the additive manufacturing system 100 (e.g., EB source movement strategy), and/or the like. That is, a user may input information via the user computing device 518 to control various parameters of the additive manufacturing process. In some embodiments, the user computing device 518 may provide a user with information pertaining to any detected anomalies in article manufacture based on a determination made from the various processes described herein. For example, the user computing device 518 may provide one or more error messages, one or more detailed descriptions, one or more options for further action, and/or the like to a user via the user interface.

The database server 520 is generally a repository of data that is used for the purposes of determining correlations between deposition of material and article formation as described herein. That is, the database server 520 may contain one or more storage devices for storing data pertaining to information received from the detector 128 (FIG. 1), any generated calculations, machine learning related information, and/or the like. In some embodiments, the database server 520 may contain information therein that mirrors the information stored in the data storage component 406 (FIG. 3A) or may be used as an alternative to the data storage component 406 (FIG. 3A), such as an offsite data repository. The database server 520 may be accessible by one or more other devices and/or systems coupled to the control network 500 and may provide the data as needed.

The electronic device 522 may generally be any device that contains hardware that is operable to be used as an interface between a user and the other components of the control network 500. Thus, the electronic device 522 may be used to perform one or more user-facing functions, such as receiving data from one or more external components, displaying information to a user, receiving one or more user inputs, transmitting signals corresponding to the one or more user inputs, and/or the like. While FIG. 4 depicts the electronic device 522 as a smart phone, it should be understood that this is a nonlimiting example. That is, the electronic device 522 may be any mobile phone, a tablet computing device, a personal computing device (e.g., a personal computer), and/or the like. In some embodiments, the electronic device 522 may have similar functionality as the user computing device 518, as described herein.

It should be understood that while the user computing device 518 is depicted as a personal computer, the database server 520 is depicted as a server, and the electronic device 522 is depicted as a mobile device, these are nonlimiting examples. In some embodiments, any type of computing device (e.g., mobile computing device, personal computer, server, cloud-based network of devices, etc.) or specialized electronic device may be used for any of these components. Additionally, while each of these computing devices is illustrated in FIG. 5 as a single piece of hardware, this is also merely an example. Each of the user computing device 518, the database server 520, and the electronic device 522 may represent a plurality of computers, servers, databases, components, and/or the like.

While FIG. 4 depicts the various systems and/or components communicatively coupled to one another via the control network 500, this is merely illustrative. In some embodiments, various components may be communicatively coupled to one another via a direct connection. In some embodiments, various components may be integrated into a single device.

It is contemplated that certain components of the additive manufacturing system 100 described herein may be separately provided as a kit of parts which may be used to retro fit additive manufacturing systems which do not have the detector(s) 128, target 120, or plate(s) 122 (referring to FIGS. 1-2). For example, in one embodiment, a kit of parts for retrofitting an additive manufacturing system for in-situ inspection may include at least one detector, a target 120, and/or a plate 122, which are packaged together. In addition, the kit of parts for retrofitting an additive manufacturing system may also include interface hardware for interfacing the detector 128 with an existing control component (e.g., an existing analysis device), and/or one or more components coupled to the control network 500. In some embodiments, the kit of parts may also include one or more programming instructions or other software modules that are installed in the existing computing devices of the additive manufacturing system for operating the detector 128 for retrieving information therefrom. Alternatively, the software may be provided as part of an additional hardware component (e.g., an additional memory module) that is communicatively coupled to existing computing components. The kit may further include instructions for affixing the detector(s) 128, target 120, or plate(s) 122 to existing components of an additive manufacturing system as described herein.

As noted above, the kit of parts may be used to retrofit and convert an existing additive manufacturing system to an additive manufacturing system with in-situ inspection capabilities. The various parts of the kit of parts may be installed within or near the build chamber as described hereinabove, converting the existing additive manufacturing system to an additive manufacturing system having an in-situ inspection system.

The various embodiments depicted in FIGS. 1-2, 3A-3B, and 4 should now generally be understood. That is, the embodiment depicted in FIGS. 1-2 includes the one or more measuring devices (such as the detector 128) and the EB source 101. In the embodiment depicted FIGS. 3A-3B, the analysis component 190 may include various internal components that provide functionality for the analysis component 190 to determine a defect in the component 126, determine corresponding characteristics of the component 126 and/or parameters of the additive manufacturing system 100. Further, external control of the various components of FIGS. 1-2 and 3A-3B can be completed using one or more of the components depicted in the embodiment of FIG. 4.

In some embodiments, the EB source 101 further includes at least one bending coil 116. In the embodiment depicted in FIG. 5, the at least one astigmatism coil 110 may be positioned closest to the emitter 103 relative to the at least one focusing coil 112, the at least one deflection coil 117, and the at least one bending coil 116, the focusing coil 112 may be positioned closer to the emitter 103 relative to the at least one deflection coil 117 and the at least one bending coil 116, the at least one deflection coil 117 may be positioned closer to the emitter 103 relative to the at least one bending coil 116, and the at least one bending coil 116 may be positioned farthest away from the emitter 103. However, this is merely illustrative, and other positions of the various coils relative to the emitter 103 are contemplated and included within the scope of the present disclosure.

The at least one bending coil 116 is generally a coil of electrically conductive material that has a plurality of turns/windings and is electrically coupled to a power source (e.g., the power supply). The at least one bending coil 116 is positioned relative to the emitter 103 and/or the at least one deflection coil 117 such that electrons emitted by the emitter 103 and focused into a beam by the at least one astigmatism coil 110, the at least one focusing coil 112, and the at least one deflection coil 117 are passed through a center of the at least one bending coil 116 (e.g., a void defined by the plurality of turns/windings of the at least one bending coil 116). That is, the at least one bending coil 116 is along the electron path defined by the deflected beam 107 depicted in FIG. 5. The arrangement and location of the at least one bending coil 116 relative to the emitter 103 and/or the coils 110, 112, 117, and/or the shape and size of the plurality of turns/windings may be such that, when an electrical current is applied across the at least one bending coil 116 a magnetic field and/or an electrical field is generated in the void defined by the turns/windings. The magnetic field and/or electrical field acts to direct and further bend the electron beam by the at least one bending coil 116, causing the resulting electron beam to be directed to a particular location based on the characteristics of the magnetic field and/or electrical field. As such, modification of the electrical current applied across the at least one bending coil 116 alters the magnetic field and/or electrical field, which in turn alters the path of travel of the electron beam. For example, the at least one bending coil 116 may alter the path of travel of the deflected beam 107 to a bent beam 115. In some embodiments, the at least one bending coil 116 may be referred to as a “bending lens” (e.g., a bending electromagnetic lens).

Figure 6:
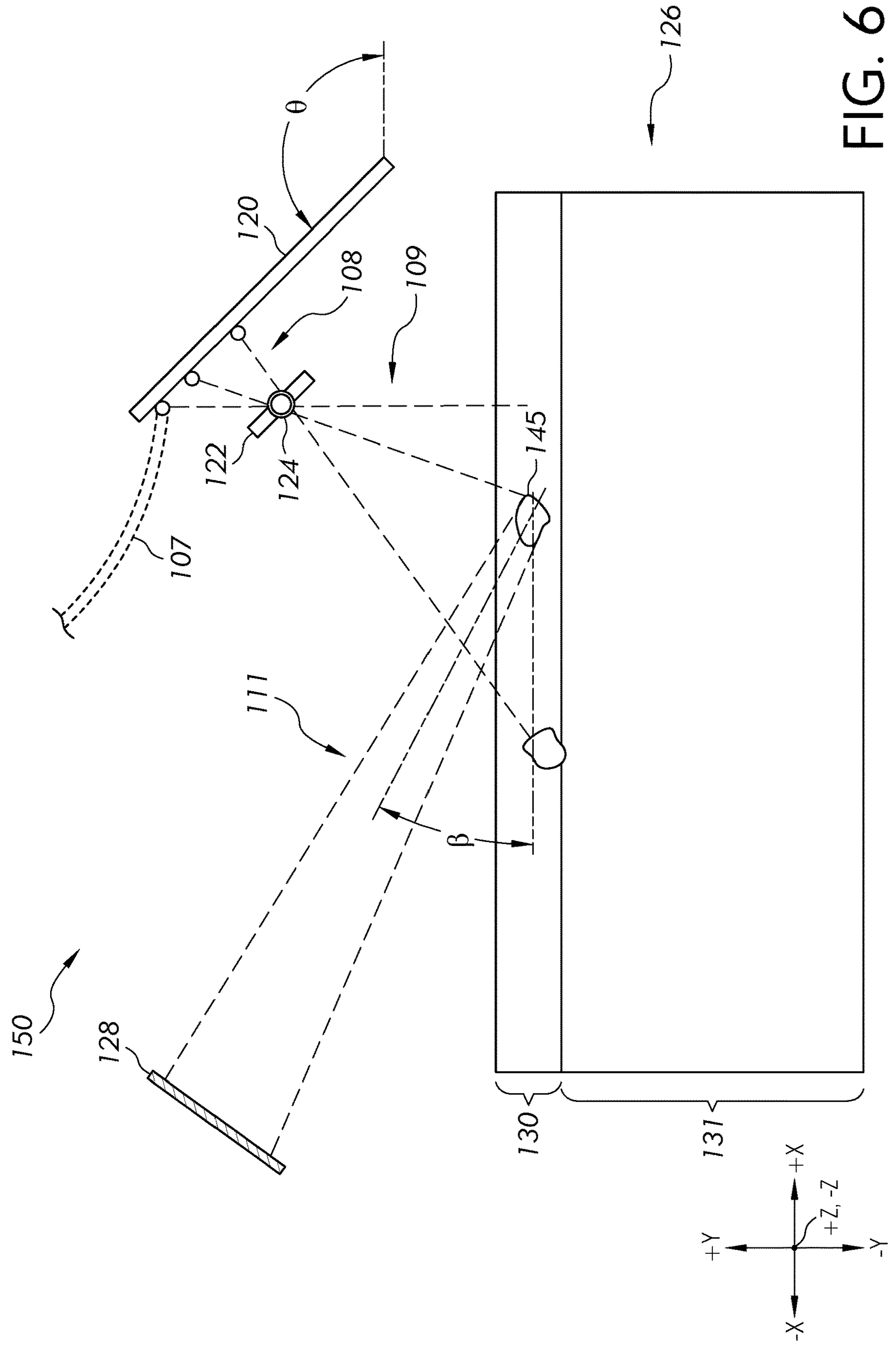
FIG. 6 schematically depicts a cross-section view of another illustrative backscatter radiation imaging system for in-situ part inspection within an additive manufacturing machine, according to one or more aspects shown and described herein.

Referring now to FIG. 5, in one or more embodiments, the additive manufacturing machine 200 for in-situ inspection may be substantially similar to the additive manufacturing system 100 depicted in FIG. 1 in-situ inspection. However, the additive manufacturing machine 200 depicted in FIG. 5 further includes a bending coil 116 in addition to the target 120 being positioned along the electron path between the emitter 103 and the component 126 at the angle θ that is larger than the angle θ depicted in FIG. 1. That is, the bending coil 116 directs the x-ray flux as a bent beam 115 for example. In some aspects, the bending coil 116 may cause the bent beam 115 to be deflected toward a target 120 that is placed in a corner of the process chamber 150 (i.e., farther along the positive x and positive y axis). Such positioning of the target 120 and deflection of the bent beam 115 may be utilized in in-situ inspections for larger components Referring now to FIG. 6, a detailed cross-section of a portion of the process chamber 150 of the additive manufacturing system 200 schematically depicts the bent beam 115 contacting the target 120 at the angle θ. In some embodiments, the angle θ may be obtuse (greater than 90°) with respect to the component 126, such as is depicted in FIG. 6. The bent beam 115 impacts the target 120 at the angle θ to generate the multidirectional x-ray flux 108, resulting in the multidirectional x-ray flux 108 traveling along various electron paths depicted in FIG. 6. The plate 122 directs the multidirectional x-ray flux 108 through the pinhole 124 to produce the x-ray flux 109 that reaches the interaction layer 130 of the component 126 in the form of a small spot. The embodiments depicted in FIGS. 5 and 6 may be useful when the target 120 is positioned near the corner of the process chamber 150 such that the bent beam can impinge it.

Figure 7:
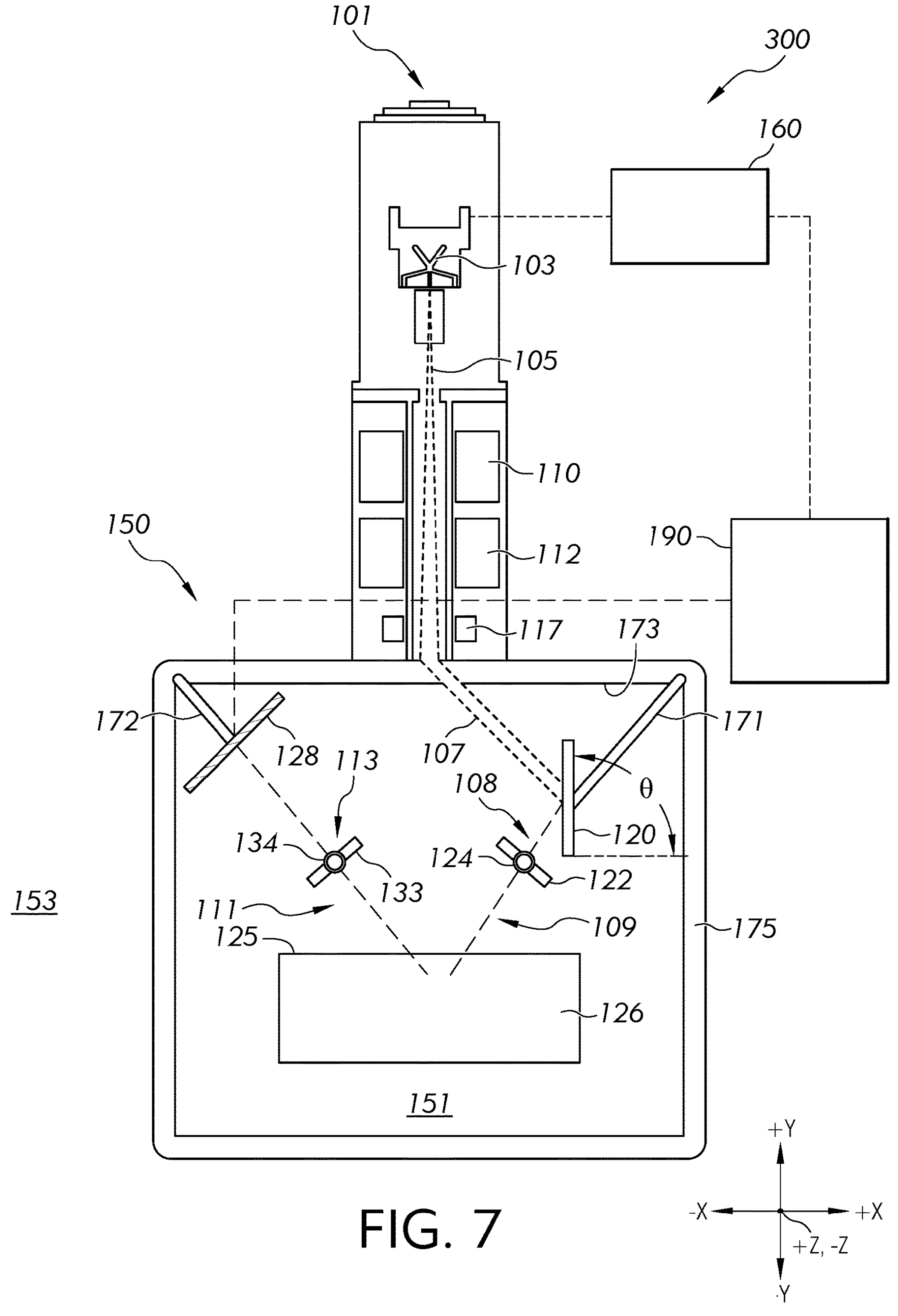
FIG. 7 schematically depicts a cross-section view of yet another illustrative machine core of an additive manufacturing machine according to one or more aspects shown and described herein.
Figure 8:
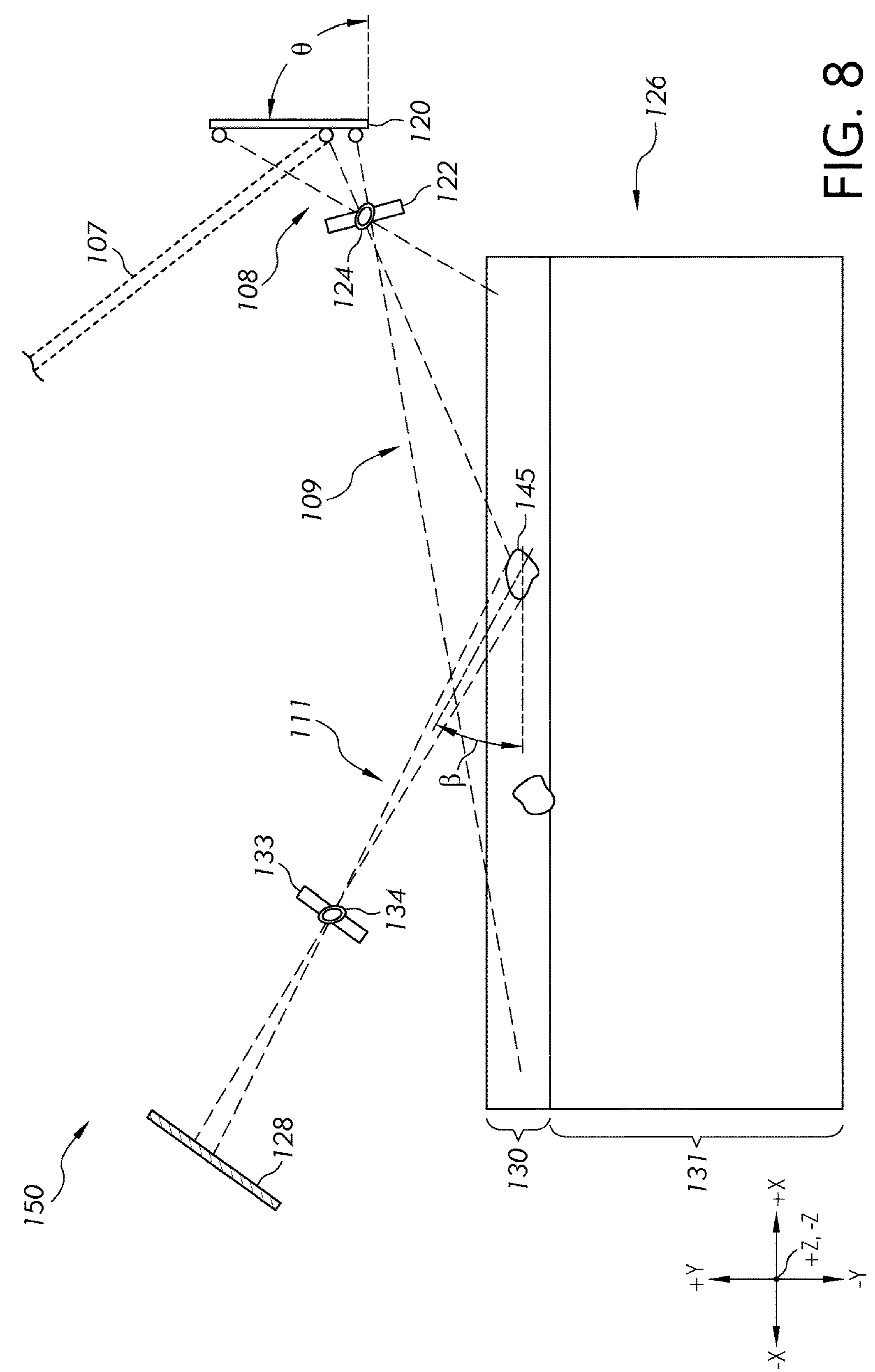
FIG. 8 schematically depicts a cross-section view of yet another illustrative backscatter radiation imaging system for in-situ part inspection within an additive manufacturing machine, according to one or more aspects shown and described herein.

Referring now to FIGS. 7 and 8, in one or more embodiments, the additive manufacturing system 300 for in-situ inspection may be substantially similar to the additive manufacturing system 100 depicted in FIG. 1 in-situ inspection. The difference between the additive manufacturing system 100 depicted in FIG. 1 and the additive manufacturing system 300 depicted in FIGS. 7 and 8 relates to the use of an additional plate 133 defining a pinhole 134 therethrough such that x-ray radiation may be further directed to the detector 128. That is, the at least one detector may be able to detect x-ray radiation from a smaller portion of an interaction of the x-ray flux 109 with the component 126. This may be utilized for focusing on small segments of the component 126.

The x-ray radiation 111 emanates from the impingement of the x-ray flux 109 on the interaction layer 130 of the component 126. The additional plate 133 directs the x-ray radiation 111 through the pinhole 134. Said differently, only part of the x-ray radiation 111 is directed through the pinhole 134 toward the detector 128. X-ray radiation 111 emanating from the component 126 around the undesirable subsurface feature (defect 145) as a result of impingement of the x-ray flux 109 is detected by the detector 128. X-ray radiation 111 detected at angle(s) β can then be used to reverse trace the path of x-ray radiation 111 through triangulation, for example, by the analysis component 190, to create a model of the interaction layer 130 or the undesirable feature (in FIG. 2, defect 145). The x-ray radiation 111 that is directed through the pinhole 134 allows the detector 128 to detect x-ray radiation 111 that emanates from a specific area of the component 126. Accordingly, the type, size, and depth of the undesirable feature may be identified and determined. In embodiments, the detector 128 may be located outside an interior 151 of the process chamber 150 (i.e., in the exterior environment 153) so as to not expose the detector 128 to the harsh conditions of the process chamber 150.

Figure 9:
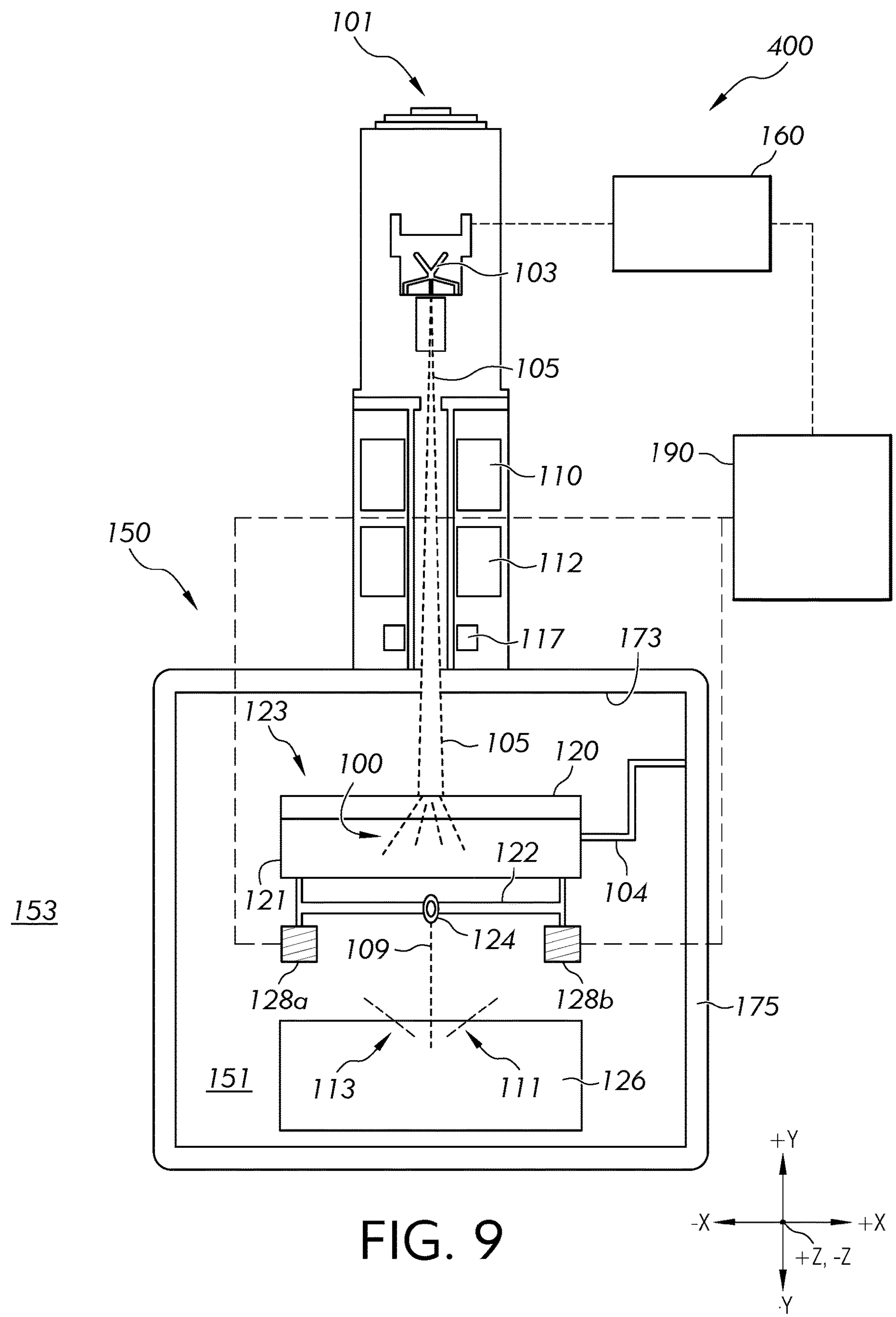
FIG. 9 schematically depicts a cross-section view of still another illustrative machine core of an additive manufacturing machine according to one or more aspects shown and described herein.
Figure 10:
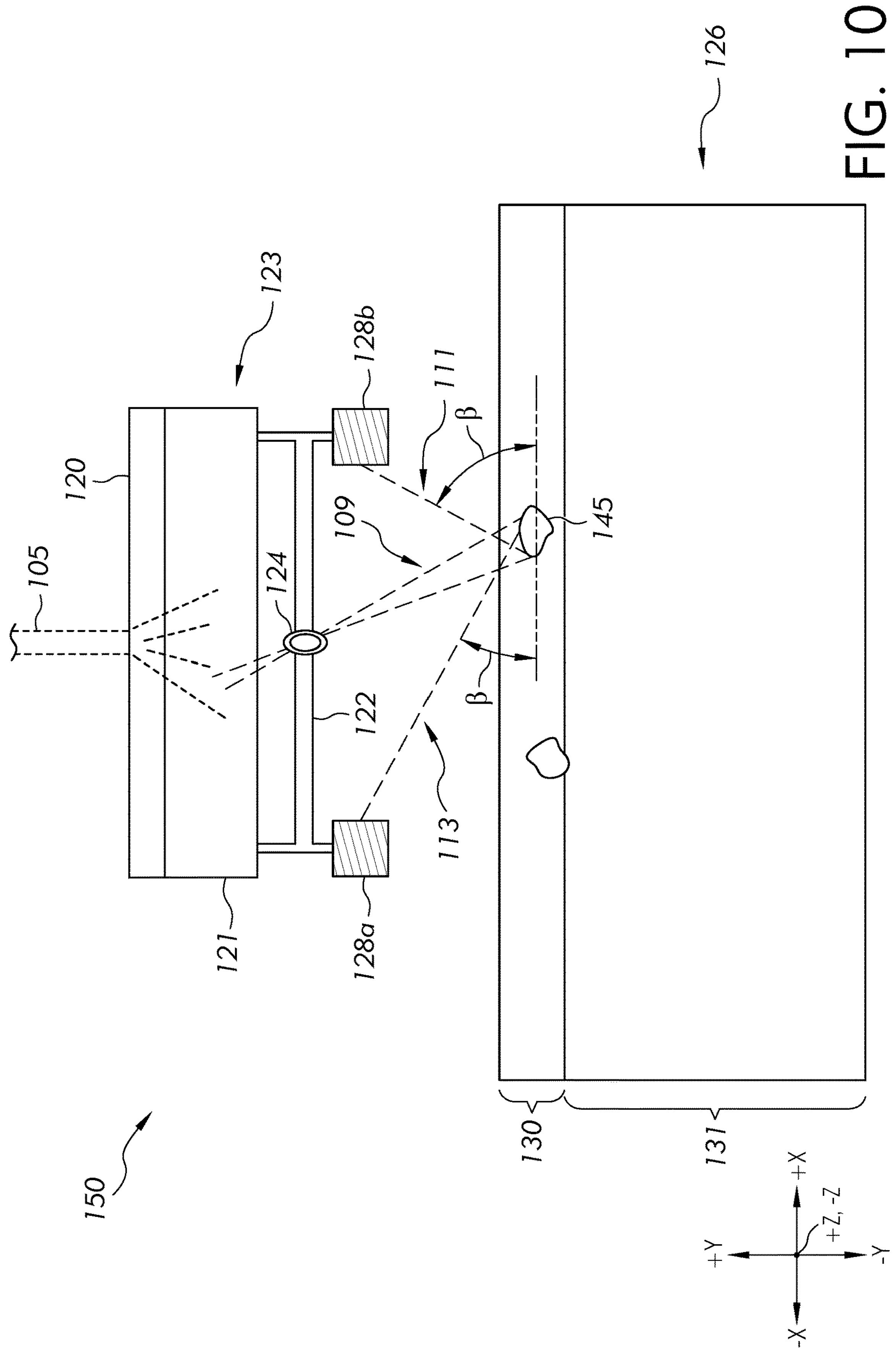
FIG. 10 schematically depicts a cross-section view of still another illustrative backscatter radiation imaging system for in-situ part inspection within an additive manufacturing machine, according to one or more aspects shown and described herein.

Referring now to FIGS. 9 and 10, in one or more embodiments, the additive manufacturing system 400 for in-situ inspection may be substantially similar to the additive manufacturing system 100 depicted in FIG. 3 in-situ inspection. The difference between the additive manufacturing system 300 depicted in FIGS. 7 and 8 and the additive manufacturing system 400 depicted in FIGS. 9 and 10 relates to the use of an arm 104 configured to move a transmission target 123 horizontally, wherein the transmission target 123 includes the target 120 and a low-density material 121, wherein the angle θ with respect to the component 126 is 0° such that the transmission target 123 is parallel or substantially parallel to the component 126.

The arm 104 may move the transmission target 123 horizontally along the x-axis and within the z-axis to allow the in-situ inspection to occur over the entirety of the component 126. The electron beam 105 be perpendicular to the component 126 and may be directed toward the transmission target 123. Additionally, the arm 104 may conduct electrons produced from the EB source 101 such that at least some of the electrons generated by the EB avoid going to the component 126 and are conducted along the arm 104. The additive manufacturing system 400 may allow any electron beam generated from the EB source 101 to avoid deflection or bending through a lens. The multidirectional x-ray flux 108 be directed through the pinhole 124 of the plate 122 such that the x-ray flux 109 may interact with the component 126. This interaction may generate a first and second x-ray radiation (113, 111). As depicted in FIG. 10, a first detector **128*a* and a second detector 128*b* detect the first x-ray radiation 113 and the second x-ray radiation 111, respectively. In some embodiments, there may be only one detector 128 that is shaped in the form of a donut. That is, a detector 128** may extend radially over at least a portion of the z-axis.

Figure 11:
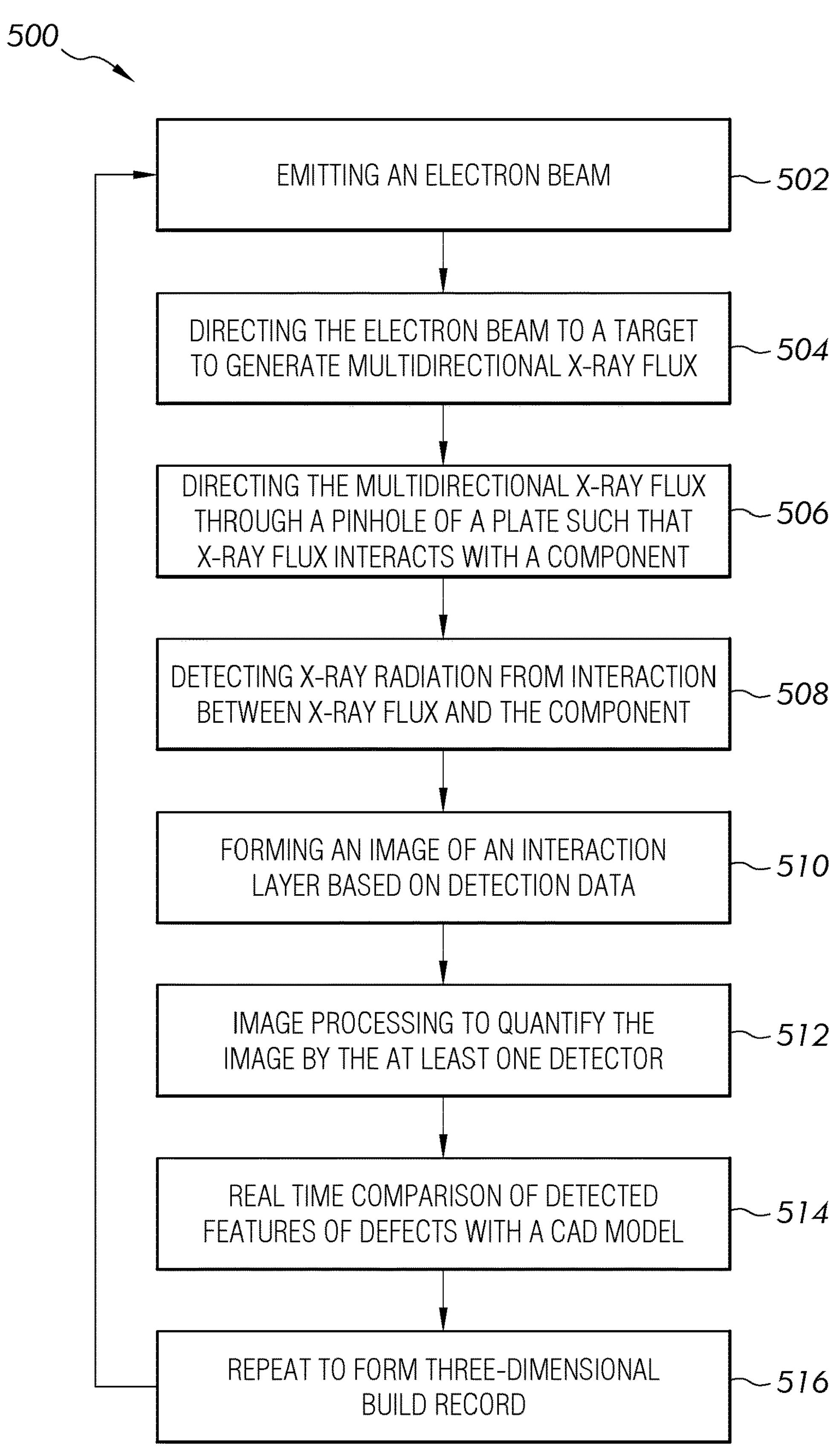
FIG. 11 is a flow diagram of an illustrative method of in-situ inspection of a component manufactured in an additive manufacturing system according to one or more aspects shown and described herein.

FIG. 11 is a flow diagram of a method 501 of monitoring the component 126 manufactured in any of additive manufacturing systems 100, 200, 300, or 400. Method 501 includes emitting 502 an electron beam 105. The electron beam 105 may be emitted from an EB gun 101. The electron beam 105 may be emitted in the direction of space defined by the at least one astigmatism coil 110, the at least one focusing coil 112, and the at least one deflection coil 117.

Method 501 includes directing 504 the electron beam 105 to impinge a target 120 at an angle θ to generate a multi-directional x-ray flux 108. The electron beam may be deflected to form a deflected beam 107, and may be further bent by a bending coil 116 to form a bent beam 115, to impinge the target 120. The deflected beam 107 or bent beam 115 is impinged upon the target 120, and multidirectional x-ray flux 108 is generated via interactions of the bombardment of the electrons of the deflected beam 107 with electrons of target nuclei.

Method 501 also includes directing 506 the multidirectional x-ray flux 108 through a pinhole 124 of a plate 122 such that x-ray flux 109 interacts with a component 126. The plate 122 directs the multidirectional x-ray flux 108 through the pinhole 124. Said differently, only part of the multidirectional x-ray flux 108 is directed through the pinhole 124 as x-ray flux 109, toward the component 126. to produce the x-ray flux 109 that reaches the interaction layer 130 of the component 126.

Method 501 also includes detecting 508, by at least one detector 128, x-ray radiation 111. The x-ray radiation 111 is radiation that emanates from the component as a result of the impingement of the x-ray flux 109 on the component 126. The x-ray radiation 111 emanating from the component 126 around the undesirable subsurface feature (the defect 145) as a result of impingement of the x-ray flux 109 is also detected by the detector 128

Method 501 also includes forming 510 an image of an interaction layer 130 by the detector 128. X-ray radiation 111 detected at angle(s) β can then be used to reverse trace the path of x-ray radiation 111 through triangulation, for example, by the analysis component 190, to create a model of the interaction layer 130 or the undesirable feature (in FIG. 2, defect 145). Accordingly, the type, size, and depth of the undesirable feature may be identified and determined.

Method 501 also includes image processing 512 to quantify the image by determining three-dimensional coordinates of a feature within component 126. Image processing software runs on the machine computer in real time to reconstruct the three-dimensional image of the build part as the analysis component receives information and data regarding the defect 145 derived from the emanation of the radiation from the component 126. It is contemplated that repairs may be made during the build when possible, Method 501 also includes real time comparison 514 of detected features or defect(s) 145 with a CAD model to generate a report of the features and defects. The latter could be used for process adjustment feedback or in-process repair.

Method 501 further repetition 516 of steps 502 through 514 to form the three-dimensional build record, a feature within component 126.

In view of the above, it should now be understood that at least some embodiments of the present disclosure are directed to an additive manufacturing system configured to generate an electron beam directed toward a target to generate x-ray flux. The x-ray flux is directed toward the component through at least one plate with a pinhole. Interactions between the component and the x-ray flux generate x-ray radiation. The at least one detector is configured to detect the x-ray radiation through a pinhole. An analysis component is configured to generate an image comprising a three-dimensional component based on the x-ray radiation detected by the at least detector.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

An exemplary technical effect of the methods and systems described herein includes: (a) detecting undesirable subsurface features using an detection device; (b) identifying a location, size, and depth of the features for correction; (c) increasing efficiency of the additive manufacturing process through early detection of undesirable features; (d) increasing quality of additive manufacturing components; (e) and identifying a location of the features for correction.

Illustrative embodiments of systems and methods for imaging systems for additive manufacturing systems are described above in detail. The methods and systems are not limited to the specific embodiments described herein, but rather, components of systems and steps of the methods may be utilized independently and separately from other components and steps described herein. For example, the method may also be used in combination with other detection systems, and are not limited to practice only with the additive manufacturing systems as described herein. Rather, the exemplary embodiments can be implemented and utilized in connection with many other applications.

Although specific features of various embodiments of the present disclosure may be shown in some drawings and not in others, this is for convenience only. In accordance with the principles of embodiments of the present disclosure, any feature of a drawing may be referenced and claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, or any other circuit or processing device capable of executing the functions described herein. The methods described herein may be encoded as executable instructions embodied in a computer readable medium, including, without limitation, a storage device or a memory device. Such instructions, when executed by a processing device, cause the processing device to perform at least a portion of the methods described herein. The above examples are illustrative only, and thus are not intended to limit in any way the definition and meaning of the term processor and processing device.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects are provided by the subject matter of the following clauses:

An apparatus for in-situ inspection, comprising: an electron emitter configured to emit electrons such that the electrons penetrate a component, wherein the electrons move along an electron path between the electron emitter and the component; a target positioned between the electron emitter and the component at an angle with respect to the component such that interaction between the target and the electrons generates a multidirectional x-ray flux; a plate defining a pinhole therethrough, positioned along the electron path between the target and the component such that the multidirectional x-ray flux is directed through the pinhole toward the component positioned with respect to the angle to direct an x-ray flux onto the component; and at least one detector positioned to detect x-ray radiation from the x-ray flux that penetrates the component, wherein the x-ray radiation is converted to coordinates that correspond to a spatial reference comprising a three-dimensional area of the component.

The apparatus of the preceding clause, wherein the electron emitter is an electron gun comprising at least at least one astigmatism coil, at least one focusing coil, or at least one deflection coil, or a combination thereof.

The apparatus of any preceding clause further comprising an enclosure surrounding the target and the plate such that the at least one detector is disposed outside of the enclosure.

The apparatus of any preceding clause further comprising a bending coil configured to deflect the electrons emitted from the electron emitter to the target, wherein the bending coil is positioned along the electron path between the electron emitter and the target.

The apparatus of any preceding clause further comprising a second plate defining a second pinhole therethrough positioned between the part and the at least one detector such that the x-ray radiation passes through the second pinhole prior to detection by the at least one detector.

The apparatus of any preceding clause wherein the coordinates comprise a depth of the component such that the at least one detector may generate images of one or more voids, pores, trapped powder, porosity, cracks or lack-of-fusion within the component.

The apparatus of any preceding clause further comprising an arm configured to move a transmission target horizontally, wherein the transmission target comprises the target and a low-density material, wherein the angle with respect to the component is at or near 0° such that the transmission target is parallel to the component.

An additive manufacturing system, comprising: a process chamber for manufacturing a component; and an apparatus for in-situ inspection, comprising: an electron beam source configured to emit an electron beam such that the electron beam penetrates the component, wherein the electron beam moves along an electron beam path between the electron beam source and the component; a target positioned along the electron beam path between the electron beam source and the component at an angle with respect to the component such that interaction between the target and the electron beam generates a multidirectional x-ray flux; a plate defining a pinhole therethrough, positioned along the electron beam path between the target and the component such that the multidirectional x-ray flux is directed through the pinhole toward a component positioned with respect to the angle to direct an x-ray flux onto the component; and at least one detector positioned to detect x-ray radiation generated from the x-ray flux that penetrates the component, wherein the x-ray radiation is converted to coordinates that correspond to a spatial reference comprising a three-dimensional area of the component.

The system of the preceding clause, wherein the at least one detector is disposed outside of the process chamber.

The system of any preceding clause, further comprising a bending coil configured to deflect the electron beam emitted from the electron beam source to the target, wherein the bending coil is positioned along the electron beam path between the electron beam source and the target.

The system of any preceding clause, further comprising a second plate defining a second pinhole positioned between the part and the at least one detector such that the x-ray radiation can pass through the second pinhole prior to detection by the at least one detector.

The system of any preceding clause, wherein the coordinates comprise a depth of the component such that the at least one detector may generate images of one or more voids, pores, trapped powder, porosity, cracks or lack-of-fusion within the component.

The system of any preceding clause, further comprising an arm configured to move a transmission target horizontally, wherein the transmission target comprises the target and a low-density material, wherein the angle with respect to the component is at or near 0° such that the transmission target is parallel to the component.

A method of in-situ inspection of an additively manufactured component, the method comprising: emitting an electron beam from an electron beam source to penetrate a component, wherein the electron beam moves along an electron beam path between the electron beam source and the component; directing the electron beam using a target at an angle such that interaction between the target and the electron beam generate a multidirectional x-ray flux; directing the multidirectional x-ray flux to a plate defining pinhole therethrough such that the multidirectional x-ray flux is directed through the pinhole toward a component positioned with respect to the angle to direct an x-ray flux onto the component; and detecting, with at least one detector, x-ray radiation from the x-ray flux penetrating a component at coordinates, wherein the coordinates indicate a spatial reference comprising a three-dimensional area of the component.

The method of the preceding clause, further comprising a step of forming an image of one or more defects defined within the component.

The method of the preceding clause, wherein the one or more defects comprises at least one of voids, pores, trapped powder, porosity, cracks or lack-of-fusion within the component.

The method of any preceding clause, further comprising a step of image processing to quantify the image by determining three-dimensional coordinates of the at least one defect within the component.

The method of the preceding clause, further comprising a step of comparing, in real time, at least one of the defects defined within the component with a CAD model of the component.

The method of the preceding clause, further comprising repairing at least one of the defects within the component.

The method of any preceding clause, wherein the at least one detector is disposed outside of an enclosure.

A kit of parts for retrofitting an additive manufacturing system for in-situ inspection of components, the kit of parts comprising: one or more detectors; a target; one or more plates defining pinholes therethrough; an analysis component programmed to operate the at least one detector and to retrieve information therefrom; instructions for coupling the target, the one or more plates, and the one or more detectors to the additive manufacturing system and to the analysis component such that, when the additive manufacturing system is utilized to form a component, an electron beam is directed toward the target to generate a multidirectional x-ray flux that is directed through the one or more plates to direct x-ray flux toward a component, which causes an x-ray radiation that is detectable by the one or more detectors and the analysis component to determine a potential defect.

What is claimed is:

1. An apparatus for in-situ inspection, comprising:

an electron emitter configured to emit electrons such that the electrons penetrate a component, wherein the electrons move along an electron path between the electron emitter and the component;

a target positioned between the electron emitter and the component at an angle with respect to the component such that interaction between the target and the electrons generates a multidirectional x-ray flux;

a plate defining a pinhole therethrough, positioned along the electron path between the target and the component such that the multidirectional x-ray flux is directed through the pinhole toward the component positioned with respect to the angle to direct an x-ray flux onto the component; and at least one detector positioned to detect x-ray radiation from the x-ray flux that penetrates the component, wherein the x-ray radiation is converted to coordinates that correspond to a spatial reference comprising a three-dimensional area of the component.

2. The apparatus of claim 1, wherein the electron emitter is an electron gun comprising at least at least one astigmatism coil, at least one focusing coil, or at least one deflection coil, or a combination thereof.

3. The apparatus of claim 1, further comprising an enclosure surrounding the target and the plate such that the at least one detector is disposed outside of the enclosure.

4. The apparatus of claim 1, further comprising a bending coil configured to deflect the electrons emitted from the electron emitter to the target, wherein the bending coil is positioned along the electron path between the electron emitter and the target.

5. The apparatus of claim 1, further comprising a second plate defining a second pinhole therethrough positioned between the component and the at least one detector such that the x-ray radiation passes through the second pinhole prior to detection by the at least one detector.

6. The apparatus of claim 1, wherein the coordinates comprise a depth of the component such that the at least one detector may generate images of one or more voids, pores, trapped powder, porosity, cracks or lack-of-fusion within the component.

7. The apparatus of claim 1, further comprising an arm configured to move a transmission target horizontally, wherein the transmission target comprises the target and a low-density material, wherein the transmission target is positioned parallel to the component.

8. An additive manufacturing system, comprising:

a process chamber for manufacturing a component; and an apparatus for in-situ inspection, comprising:

an electron beam source configured to emit an electron beam such that the electron beam penetrates the component, wherein the electron beam moves along an electron beam path between the electron beam source and the component;

a target positioned along the electron beam path between the electron beam source and the component at an angle with respect to the component such that interaction between the target and the electron beam generates a multidirectional x-ray flux;

a plate defining a pinhole therethrough, positioned along the electron beam path between the target and the component such that the multidirectional x-ray flux is directed through the pinhole toward a component positioned with respect to the angle to direct an x-ray flux onto the component; and at least one detector positioned to detect x-ray radiation generated from the x-ray flux that penetrates the component, wherein the x-ray radiation is converted to coordinates that correspond to a spatial reference comprising a three-dimensional area of the component.

9. The system of claim 8, wherein the at least one detector is disposed outside of the process chamber.

10. The system of claim 8, further comprising a bending coil configured to deflect the electron beam emitted from the electron beam source to the target, wherein the bending coil is positioned along the electron beam path between the electron beam source and the target.

11. The system of claim 8, further comprising a second plate defining a second pinhole positioned between the component and the at least one detector such that the x-ray radiation can pass through the second pinhole prior to detection by the at least one detector.

12. The system of claim 8, wherein the coordinates comprise a depth of the component such that the at least one detector may generate images of one or more voids, pores, trapped powder, porosity, cracks or lack-of-fusion within the component.

13. The system of claim 8, further comprising an arm configured to move a transmission target horizontally, wherein the transmission target comprises the target and a low-density material, wherein the transmission target is positioned parallel to the component.

14. A method of in-situ inspection of an additively manufactured component, the method comprising:

emitting an electron beam from an electron beam source to penetrate a component, wherein the electron beam moves along an electron beam path between the electron beam source and the component;

directing the electron beam using a target at an angle such that interaction between the target and the electron beam generate a multidirectional x-ray flux;

directing the multidirectional x-ray flux to a plate defining pinhole therethrough such that the multidirectional x-ray flux is directed through the pinhole toward a component positioned with respect to the angle to direct an x-ray flux onto the component; and detecting, with at least one detector, x-ray radiation from the x-ray flux penetrating a component at coordinates, wherein the coordinates indicate a spatial reference comprising a three-dimensional area of the component.

15. The method of claim 14, further comprising a step of forming an image of containing one or more defects defined within the component.

16. The method of claim 15, wherein the one or more defects comprises at least one of voids, pores, trapped powder, porosity, cracks or lack-of-fusion within the component.

17. The method of claim 15, further comprising a step of processing the image to identify three-dimensional coordinates of the one or more defects within the component.

18. The method of claim 17, further comprising a step of comparing, in real time, at least one of the one or more defects defined within the component with a CAD model of the component.

19. The method of claim 18, further comprising repairing the at least one of the one or more defects within the component.

20. The method of claim 14, wherein the at least one detector is disposed outside of an enclosure.

* * * * *